US010021008B1

(12) United States Patent
Pai et al.

(10) Patent No.: US 10,021,008 B1
(45) Date of Patent: Jul. 10, 2018

(54) POLICY-BASED SCALING OF COMPUTING RESOURCE GROUPS

(71) Applicant: Amazon Technologies, Inc., Seattle, WA (US)

(72) Inventors: Derek Solomon Pai, Seattle, WA (US); Alison Qing-Ning Truong, Seattle, WA (US); Eric Samuel Stone, Seattle, WA (US); Ahmed Usman Khalid, Vancouver (CA); Kai Fan Tang, Port Coquitlam (CA); Mai-Lan Tomsen Bukovec, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 351 days.

(21) Appl. No.: 14/754,491

(22) Filed: Jun. 29, 2015

(51) Int. Cl.
| G06F 15/16 | (2006.01) |
| G06F 15/173 | (2006.01) |
| H04L 12/26 | (2006.01) |
| H04L 12/911 | (2013.01) |

(52) U.S. Cl.
CPC ........ *H04L 43/0876* (2013.01); *H04L 47/783* (2013.01); *H04L 47/821* (2013.01)

(58) Field of Classification Search
CPC .. H04L 43/0876; H04L 47/783; H04L 47/821
USPC ....................................................... 709/224
See application file for complete search history.

(56) References Cited

U.S. PATENT DOCUMENTS

| 8,009,593 | B2 | 8/2011 | Ruetschi et al. |
| 8,112,524 | B2 | 2/2012 | Logan et al. |
| 8,260,739 | B1 | 9/2012 | Pelletier |
| 8,768,363 | B1 | 7/2014 | Sigg et al. |
| 8,966,085 | B2* | 2/2015 | Abuelsaad ............ G06F 9/5072 709/226 |
| 9,264,309 | B2* | 2/2016 | Jian ...................... H04L 41/0843 |
| 9,270,532 | B2* | 2/2016 | Adams ................ H04L 41/0896 |
| 9,300,552 | B2* | 3/2016 | Dube ......................... G06F 8/20 |
| 9,329,904 | B2* | 5/2016 | Wray ..................... G06F 9/5072 |
| 9,363,190 | B2* | 6/2016 | Beloglazov ............. H04L 47/70 |
| 9,430,264 | B2* | 8/2016 | Tang .................... G06F 9/45545 |
| 9,489,647 | B2* | 11/2016 | Martinez ................ G06Q 10/06 |
| 9,515,952 | B2* | 12/2016 | Thomas .................... G06F 9/50 |
| 9,547,534 | B2* | 1/2017 | Dettori .................... G06F 9/542 |
| 9,590,879 | B2* | 3/2017 | Wray ...................... H04L 43/08 |
| 9,606,828 | B2* | 3/2017 | Ghosh ................. G06F 9/45558 |
| 9,697,050 | B2* | 7/2017 | Dittrich ................... G06F 9/505 |
| 9,722,870 | B2* | 8/2017 | Rattner ............... H04L 41/0816 |
| 2004/0230680 | A1 | 11/2004 | Jain et al. |
| 2005/0021690 | A1 | 1/2005 | Peddada |
| 2006/0036680 | A1 | 2/2006 | Shim |
| 2008/0140760 | A1 | 6/2008 | Conner et al. |
| 2008/0140857 | A1 | 6/2008 | Conner et al. |

(Continued)

Primary Examiner — Melvin H Pollack
(74) Attorney, Agent, or Firm — Seed IP Law Group LLP

(57) ABSTRACT

Techniques are described for scaling a group of computing resources. A computing resource service receives a scaling policy for use in scaling the group of computing resources. The scaling policy specifies a target level for a resource utilization metric and magnitude-based changes to the group. The computing resource service receives information about a magnitude of a measurement for the resource utilization metric. The computing resource service determines, based at least in part on the scaling policy, one or more changes for the group and initiates the one or more changes in the group.

20 Claims, 12 Drawing Sheets

(56) References Cited

U.S. PATENT DOCUMENTS

| | | | |
|---|---|---|---|
| 2010/0094948 A1 | 4/2010 | Ganesh et al. | |
| 2010/0114387 A1 | 5/2010 | Chassin | |
| 2012/0066396 A1 | 3/2012 | Kang et al. | |
| 2012/0117242 A1* | 5/2012 | Aoki | G06F 9/5083 709/226 |
| 2013/0246626 A1 | 9/2013 | Glover et al. | |
| 2013/0268672 A1 | 10/2013 | Justafort et al. | |
| 2014/0207936 A1 | 7/2014 | Friedlander et al. | |
| 2014/0280898 A1 | 9/2014 | Voit et al. | |
| 2014/0359044 A1 | 12/2014 | Davis et al. | |
| 2015/0012657 A1 | 1/2015 | Botti et al. | |
| 2015/0052081 A1 | 2/2015 | Duron et al. | |
| 2015/0200872 A1 | 7/2015 | Huang et al. | |
| 2015/0256484 A1 | 9/2015 | Cameron | |
| 2016/0134558 A1* | 5/2016 | Steinder | H04L 47/783 709/226 |
| 2016/0210172 A1* | 7/2016 | Ramachandra | G06F 9/5072 |
| 2016/0330137 A1* | 11/2016 | Avci | G06F 9/5016 |
| 2016/0358249 A1* | 12/2016 | Iyer | H04L 67/10 |
| 2017/0199770 A1* | 7/2017 | Peteva | G06F 9/5088 |

\* cited by examiner

POLICY-BASED SCALING OF COMPUTING RESOURCE GROUPS

BACKGROUND

The use of remote computing resources has become increasingly prevalent in recent years. Through remote access to computing resources provided by other entities (e.g., online services), organizations are able to forego the costs associated with establishing their own computing facilities (for example, including servers and storage devices) and instead utilize computing functionality made available by providers of such computing resources. The computing resources may be used, for example, to host websites or email servers, stream multimedia, manage data pertaining to an organization, etc. Organizations may only pay for the resources they utilize and in some situations may have limited control to scale the amount of computing resources being used upward or downward, such as to reflect corresponding demand (e.g., from internal users of the organizations and/or external users that are using services or functionality provided by the organizations).

However, various problems exist with the use of such remote computing resources that are provided by another entity, including with scaling the amount of computing resources in a desired manner.

DETAILED DESCRIPTION

Figure 1:
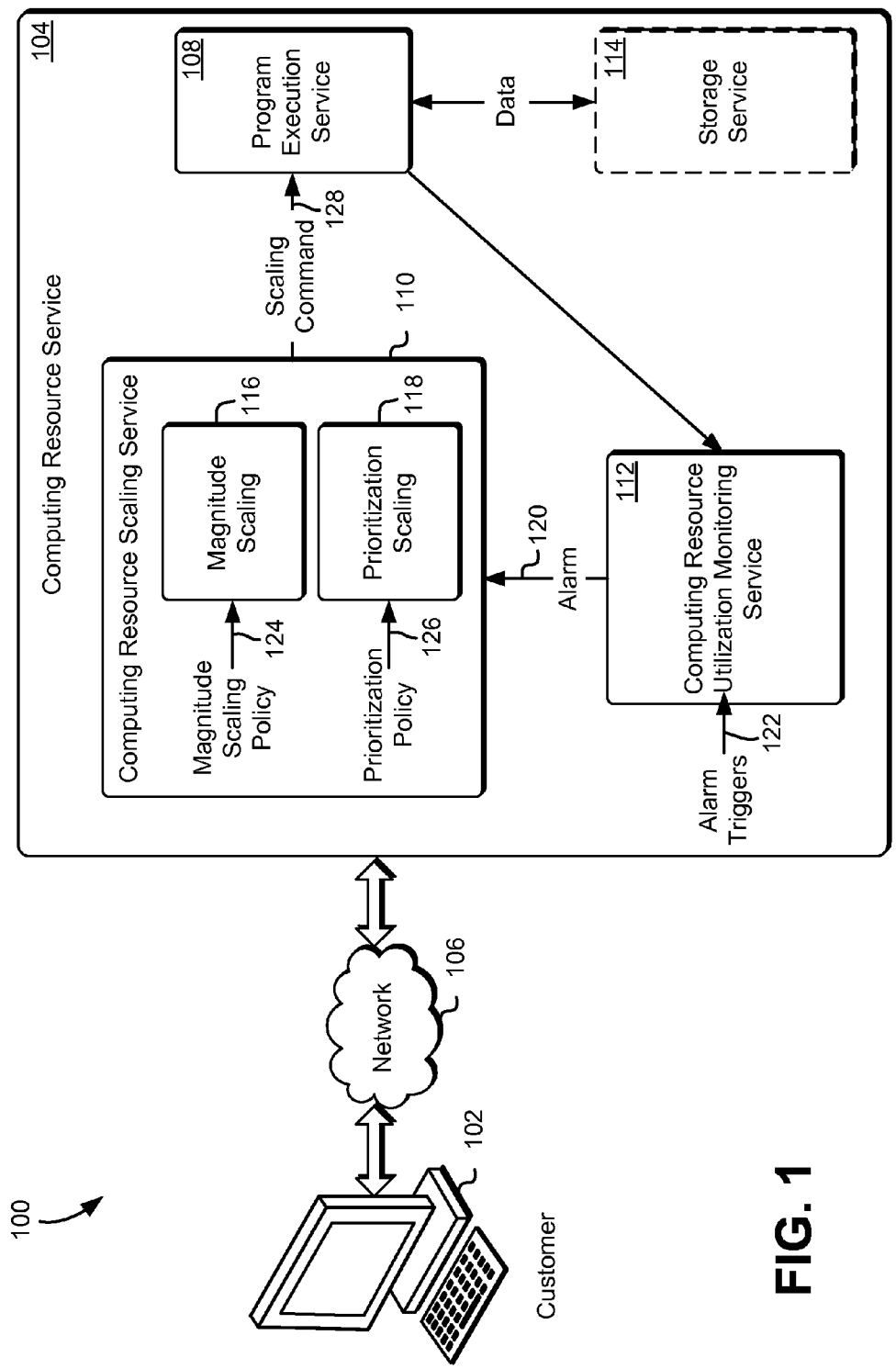
FIG. 1 shows an example of an environment in which automated techniques may be implemented for scaling computing resources being provided to clients over one or more computer networks by a computing resource service.

Techniques are described for modifying computing resources that are used by or provided for one or more users in manners configured by those users, including scaling a group of computing resources provided on behalf of a client of an online computing resource service based at least in part on one or more scaling policies specified by the client. For example and in accordance with embodiments of the invention, magnitude scaling policies can provide the amount by which to scale based on the magnitude of a breach of a particular threshold or prioritized scaling policies can provide information for prioritizing which scaling policy, among several, to select for a given breach. The computing resources that are automatically scaled or otherwise modified may include any type of resource used by or on behalf of one or more computing systems, such as a computing node able to execute one or more programs, memory, storage (e.g., a storage volume, a database, etc.), among others. A group of computing resources provided for use by a client, such as by an online computing resource service for a client that is a customer of the service, may be homogenous and/or heterogeneous computing resources of one or more types, including to have various quantities, types, locations, etc. of computing resources in a client's group.

At least some of the described techniques are performed in at least some embodiments by an automated Computing Resource Scaling Service, as described in greater detail below. For example, in a situation in which computing resources are being provided to a client by one or more online computing resource services, the Computing Resource Scaling Service may be provided by one of those online computing resource services in some embodiments, while in other embodiments the Computing Resource Scaling Service may be provided externally to those online computing resource services (e.g., with an entity that provides the Computing Resource Scaling Service being distinct from one or more other entities who provide those online computing resource services).

A customer or other client may initiate scaling-related activities for a group of computing resources by specifying one or more types of alarm triggers (also referred to as "alarm types") that each has an associated resource utilization metric, and that specify one or more conditions in which an alarm is to be generated based on values for that associated resource utilization metric. As one non-exclusive example, a first alarm trigger may be specified by a client for a first associated resource utilization metric of CPU ("central processing unit") utilization, with one or more associated threshold amounts (e.g., CPU utilization between 80% and 90%, CPU utilization over 90%, etc.) that each has an associated configured modification action (e.g., add 5 computing nodes, move to a total of 20 computing nodes, increase execution capacity by 20%, etc.). Such an alarm trigger may be configured by the client with the Computing Resource Scaling Service or with another service, such as a monitoring service—if so, the Computing Resource Scaling Service or other service may then monitor computing resources being provided for use by the client, or otherwise obtain information about the performance or use of the computing resources, in order to determine whether the conditions for any of the conditions of the first alarm trigger are satisfied (e.g., whether the CPU utilization exceeds 80% and/or 90%), and to issue one or more corresponding alarms. In other embodiments, each different threshold or other set of conditions for a particular resource utilization metric may be specified as a different alarm trigger, such that a particular resource utilization metric may have multiple alarm triggers defined by the client that each issues a separate alarm. It will also be appreciated that various other alarm triggers may be specified in various other manners, including in some situations to be defined by a computing resource service rather than by a client, as discussed in greater detail below.

The one or more alarm triggers may be part of one or more configured magnitude scaling policies in at least some embodiments. A magnitude scaling policy may specify one or more target levels or values for a resource utilization metric (e.g., 50% CPU utilization if the metric is CPU utilization, a range of 45%-55% CPU utilization, etc.), as well as have multiple defined thresholds relative to the target level that each has an associated proposed change to the group of computing resource. The magnitude scaling policy may be configured by the client for a specific group of computing resources that is or will be provided for use by the client, for any and all groups of computing resources that are or will be provided for use by the client, etc. In addition, the configured scaling policies for a client may be of multiple types in some embodiments. For example, a client may specify one or more magnitude scaling policies that are each associated with a single resource utilization metric (e.g., one policy to scale up, and one policy to scale down), and specify how to manage scaling the group of computing resources based at least in part on values or other measurements of the metric having magnitudes that reach or exceed ("breach") one or more of the defined thresholds. For example, a magnitude scaling policy may provide scaling the number of computing resources based on the magnitude of the breach, such that, for instance, if the breach is 20% above a threshold level (or baseline level), then the number of computing resources is scaled by 20% (or some amount based on that 20% magnitude breach). In addition, a client may specify one or more prioritization policies that are each associated with two or more magnitude scaling policies based on two or more resource utilization metrics, such as to specify how to manage multiple alarms that are received for those two or more resource utilization metrics by providing prioritization information related to the two or more scaling policies and their metrics. For example, if there is one magnitude scaling policy associated with CPU utilization and another magnitude scaling policy associated with memory utilization, each of those magnitude scaling policies may scale a different amount of computing resources based on the breach. If both magnitude scaling policies receive a breach at or near the same time, prioritization information can be used to determine which magnitude scaling policy to select and implement.

After a client specifies one or more magnitude scaling policies, the Computing Resource Scaling Service may proceed to perform automated operations to implement those magnitude scaling policies. For example, the Computing Resource Scaling Service may receive information about one or more alarms that occur for a client, determine whether any specified scaling policies apply to the one or more alarms, and if so, use those applicable one or more scaling policies to determine how to manage those alarms in one or more manners. In addition or as an alternative to a scaling policy, if a prioritization policy is determined to apply to multiple alarms for multiple scaling policies and/or resource utilization metrics, the Computing Resource Scaling Service may determine how to prioritize the corresponding specified modification actions for those alarms in a manner configured by the prioritization policy. For example, a single modification action may be selected to be performed (e.g., the one associated with the alarm and/or alarm trigger of the highest priority, etc.), or the changes for two or more such alarms may be accumulated or otherwise combined to produce a single change in various manners. If no scaling policies apply to one or more received alarms, various other types of corresponding actions may be taken, such as to implement a specified modification action for each of the one or more alarms. Additional details regarding scaling policies and their use are discussed below.

For illustrative purposes, some embodiments are described below in which specific types of computing resources, magnitude scaling policies, scaling operations and entities that use or provide computing resources are discussed, including with respect to using such techniques with an online service that provides functionality to scale computing resources provided by the online service in configured manners on behalf of customers. These examples are provided for illustrative purposes and are simplified for the sake of brevity, and the inventive techniques may be used in a wide variety of other situations, including in other environments and with respect to other types of software images to manufacture, some of which are discussed below. For example, in some embodiments only one or more magnitude scaling policies may be used or only one or more prioritization policies. In addition, in some embodiments the configured alarms may be part of the specified magnitude scaling policies, while in other embodiments the configured alarms may be specified separately from the magnitude scaling policies.

FIG. 1 illustrates an example of an environment in which automated techniques may be implemented for scaling computing resources being provided to clients over one or more computer networks by a computing resource service, and in which the computing resource service provides an embodiment of the Computing Resource Scaling Service for use by clients of the computing resource service. In particular, FIG. 1 shows an example of an environment 100 in which a customer 102 communicates with a computing resource service 104 over a computer network 106 to act as a client of the computing resource service. The computing resource service in this example includes a program execution service 108 that provides program execution capabilities (e.g., by providing computing nodes that can be allocated to particular customers and configured to execute particular programs for those customers), an embodiment 110 of the Computing Resource Scaling Service, a computing resource utilization monitoring service 112 and optionally one or more storage services 114. Furthermore, the example embodiment of the computing resource scaling service 110 includes a Magnitude Scaling Component 116 and a Prioritization Scaling Component 118.

The computing resource service 104 may provide a variety of services to the customer 102. The customer 102 may be an organization that may utilize the various services provided by the computing resource service 104 to maintain and deliver information to its employees, which may be located in various geographical locations. Alternatively, the customer 102 may be an individual that could utilize the various services to deliver content to a working group located remotely. As shown in FIG. 1, the customer 102 may communicate with the computing resource service 104 through a network, which may be a public network such as the Internet or an Internet service provider (ISP) network, or a private network such an intranet.

The customer 102 may communicate with the computing resource service 104 by making application programming interface (API) function calls to the computing resource service 104 via an API provided by the computing resource service, and/or via a graphical user interface (GUI) or other interactive portal of the computing resource service. As described herein, the customer 102 may use one or more computing devices, such as a computer, server, tablet or smartphone, that are configured to communicate with the computing resource service 104. For example, an administrator or an operator of the customer's organization may utilize the one or more computing devices to communicate with the computing resource service 104.

The computing resource service 104 may include computing resources collectively configured to provide computing resources to the customer 102. The computing resource service 104 may be implemented as one or more data centers that are located in various geographical areas. The computing resources provided to the customer may include computational resources, memory resources and networking resources, among others. The computing resource service 104 may include a plurality of servers or hosts that are collectively operate to provide the computational resources. Furthermore, the computing resource service 104 may include a plurality of storage devices, such as hard drives, solid-state drives, optical disks or tape drives, among others, that are collectively operate to provide memory or storage resources to the customer 102. In addition, the computing resource service 104 may include a plurality of networking equipment and devices, such as routers, that collectively operate to provide networking resources to the customer 102.

The computing resource service 104 and its associated services 108-114 may provide various computing services to customers of the computing resource service 104. The computing services may include remote program execution, whereby the computing resource service 104 may provide the computational resources necessary for executing software programs, such as hosting a web server or an email server. Furthermore, the computing resource service 104 may provide storage capability to the customer 102, and the customer 102 may store their own data or data of their own customers. The data may be stored as a block-level data volume, as object-level data, within one or more databases, as one or more computer files, etc. Furthermore, the data may be archived by the computing resource service 104 and may, accordingly, be associated with long retrieval times and low storage costs. Alternatively, the data may be stored for expeditious retrieval.

The computing resource scaling service 110 may be a collection of computing resources that are collectively configured to receive one or more alarms 120 from the computing resource utilization monitoring service 112 and initiate corresponding scaling for a group of computing resources of the customer 102. The one or more alarms 120 received by computing resource scaling service 110 may, for example, each be specified as a request for a change to the group of computing resources for the customer 102. That is as a result of the fact that an alarm 120 is triggered by a defined threshold being met and the alarm trigger has an associated change for the group of computing resources of the customer.

The example embodiment of the computing resource scaling service 110 includes a magnitude scaling component 116 and a prioritization scaling component 118, such as to handle magnitude scaling policies and prioritization policies, respectively, but in other embodiments may have only one to handle one type of policy or both policies (e.g., a single component can handle both scaling and prioritization). The magnitude scaling component 116 receives one or more magnitude scaling policies 124 and the prioritization scaling component 118 receives one or more prioritization policies 126 in this example. The magnitude scaling policies may also be part of the configuration information of the customer 102, such as to be received from the customer 102 as part of one or more API-configured function calls and/or via a GUI portal.

A magnitude scaling policy 124 may specify one or more target levels or values for a resource utilization metric and a corresponding desired amount of computing resources, as well as to specify multiple defined thresholds relative to the target level(s) or value(s). Each defined threshold relative to a target level may be associated with one or more proposed changes to the group of computing resources. For example, if an alarm is received indicating that the target level is breached (or exceeded) based on an indicated magnitude (e.g., an indicated measurement for the metric, a percentage or other relative amount by which a measurement for the metric exceeds the target level, etc.), the magnitude scaling policy is evaluated to determine one or more corresponding changes to perform for the group. For example, the changes could be based on, or be proportional to, the magnitude of the breach, such that, for instance, if the breach is 20% above a threshold level (or baseline level), then the number of computing resources is scaled by 20% (or some amount based on that 20% magnitude breach). In this way, the scaling service can dynamically change the amount of computing resources to scale with or without receiving specified scaling values from a customer. As another example, if the alarm indicates that a single defined threshold of multiple thresholds is breached, the change associated with that single threshold may be selected and made.

The magnitude scaling policy may further in some embodiments indicate a manner in which multiple changes to the group of computing resources of the customer are aggregated. The multiple changes may be the result of a measurement for a monitored resource utilization metric having a magnitude that meets multiple defined thresholds, whereby each threshold may be associated with a proposed change to the group of computing resources. The magnitude scaling policy 124 may specify that the resulting multiple changes are to be accumulated. Alternatively, the magnitude scaling policy 124 may specify that a smallest or a largest change of the multiple changes be selected. The magnitude scaling component 116 may evaluate the magnitude scaling policy 124 to determine an aggregated change to the group of computing resources. Subsequently, the computing resource scaling service 110 may cause the group of computing resources of the customer 102 to be scaled by the aggregated change to the group of computing resources. To do so, the computing resource scaling service 110 may send a scaling command 128 to the program execution service 108 requesting the program execution service 108 to scale the group of computing resources of the customer 102 by the aggregated change.

As described herein, the prioritization scaling component 118 of the computing resource scaling service 110 receives the prioritization policy 126. A prioritization policy 126 may be received from the customer 102 and may, like a magnitude scaling policy, be part of the configuration information. The prioritization policy 126 may specify how multiple proposed changes to the group are managed, such as for changes associated with multiple magnitude scaling policies or otherwise with multiple metrics. Thus, the prioritization policy may be used when the multiple changes result from a plurality of resource utilization metrics each having a defined measurement that reaches at least one defined threshold. As such, the prioritization policy specifies a priority to use if a plurality of defined thresholds are reached for a corresponding plurality of magnitude scaling policies and/or resource utilization metrics. For example, if there is one magnitude scaling policy associated with CPU utilization and another magnitude scaling policy associated with memory utilization, each of those magnitude scaling policies may scale a different amount of computing resources based on the breach. If both magnitude scaling policies receive a breach at or near the same time, prioritization information can be used to determine which magnitude scaling policy to select and implement.

The prioritization scaling component 118 determines a change from the multiple proposed changes based on the prioritization policy 126. The change may, for example, be associated with one scaling policy of a plurality of applicable scaling policies, and/or with one resource utilization metric of a plurality of applicable resource utilization metrics. After determining the change, the prioritization scaling component 118 causes the group to be scaled by the determined change. To do so the prioritization scaling component 118, sends, to the program execution service 104, the scaling command 128 requesting that the group of computing resources of the customer 102 be scaled by the determined change.

The program execution service 108 may be a collection of computing resources configured to instantiate computing nodes on behalf of customers of the computing resource service 104. Customers of the computing resource service 104 may interact with the program execution service 108 (via appropriately configured and authenticated API calls and/or via instructions that are manually and interactively specified by a user via a GUI) to provision and operate computing nodes. The computing nodes may be used for various purposes, such as to operate as servers supporting a website, to operate business applications or, generally, to serve as computing power for the customer. Other applications for the computing nodes may be to support database applications, electronic commerce applications, business applications and/or other applications. The computing nodes may be virtual computer systems that are instantiated (for example, using a hypervisor) on physical computing devices hosted and operated by the computing resource service 104. Additionally or alternatively, the computing nodes may be physical computing devices that are hosted and operated by the computing resource service 104.

A group of computing nodes comprising one or more computing nodes may be provisioned for the customer 102. Computing workload may be divided or distributed over the computing nodes of the group. The group may be scaled depending on demand for the group. For example, values for a resource utilization metric, such as processor utilization of the group, may be obtained and may be used to determine to increase the number of computing nodes of the group, so as to provide additional computing functionality when demand increases in accordance with one or more corresponding specified alarm triggers. Alternatively, values of the resource utilization metric may be used to determine that decreasing the number of computing nodes of the group is necessary. Decreasing the number of computing nodes of the group might be advantageous due to the fact that the customer is not charged a fee for those computing nodes. The computing nodes may be put back in a pool of available computing nodes of the computing resource service 104 and may be reallocated to another customer The storage service 114 may comprise a collection of computing resources that collectively operate to store data for the customer 102. The data may be stored using block-level storage devices (and/or virtualizations thereof). The block-level storage devices may, for instance, be operationally attached to computing nodes (for example, virtual computer systems provided by the program execution service 108) to serve as logical units (e.g., virtual drives) for the computing nodes. A block-level storage device may enable the persistent storage of data used/generated by a corresponding computing node where the program execution service 108 may only provide ephemeral data storage.

In various embodiments, the computing resource service 104 may include an on-demand data storage service and/or an archival data storage service. The on-demand data storage service may be a collection of computing resources configured to synchronously process requests to store and/or access data. The on-demand data storage service may operate using computing resources (e.g., databases) that enable the on-demand data storage service to locate and retrieve data quickly, so as to allow data to be provided in responses to requests for the data. For example, the on-demand data storage service may maintain stored data in a manner such that, when a request for a data object is retrieved, the data object can be provided (or streaming of the data object can be initiated) in a response to the request.

Data stored in the on-demand data storage service may be organized into data objects. The data objects may have arbitrary sizes except, perhaps, for certain constraints on size. Thus, the on-demand data storage service may store numerous data objects of varying sizes. The on-demand data storage service may operate as a key value store that associates data objects with identifiers of the data objects which may be used by the customer 102 to retrieve or perform other operations in connection with the data objects stored by the on-demand data storage service. Access to the data storage service by a customer, another service, or other entity may be through appropriately configured API calls.

The computing resource utilization monitoring service 112 may include one or more computing resource, such as servers, storage devices or routers, among others, that are collectively operable to monitor a resource utilization metric of a group of computing resources. Furthermore, the computing resource utilization monitoring service 112 may send an alarm 120 to the computing resource scaling service if a threshold or other pre-defined measurement of the resource utilization metric is reached, such as with a magnitude indicating a difference between a target level or value and a measured or observed value of the resource utilization metric.

The computing resource utilization monitoring service 112 receives one or more alarm triggers 122 in this example from the customer 102, the computing resource scaling service 110, and/or another entity. The alarm triggers 122 may be part of the configuration information or the magnitude scaling policy(ies) 124 of the customer. The one or more alarm triggers 122 may be associated with a resource utilization metric, and a trigger may include one or more levels or thresholds based upon which the computing resource utilization monitoring service 112 is to send an alarm. The computing resource utilization monitoring service 112 may send one or more alarms 120, per the one or more alarm triggers 122, if a monitored resource utilization metric exceeds a defined threshold (e.g., by going above or below a specified value). Furthermore, the computing resource utilization monitoring service 112 may send a magnitude of a value of the resource utilization metric measurement.

The computing resource utilization monitoring service 112 may monitor the use of the group of computing resources of the customer 102 and may send one or more alarms 120 if values of one or more resource utilization metrics reach thresholds defined for those metrics. The computing resource utilization monitoring service 112 may also in some embodiments send, in connection with an alarm 120, a magnitude by which the resource utilization monitoring breached (for example, exceeded) the threshold. The alarm may in some embodiments be an API-configured function call. The computing resource utilization monitoring service 112 may send an alarm for a particular resource utilization metric periodically (for example, every second, every five seconds, every minute, every five minute, etc.) or accordingly to an aperiodic schedule. If periodic alarm transmission is configured, the computing resource utilization monitoring service 112 may, upon detecting that an alarm is triggered, await until upcoming reporting time for transmitting the alarm. Transmission of the alarm may be indicative that the threshold is reached in a reporting period preceding the sending of the alarm.

The computing resource utilization monitoring service 112 may receive (for example, as part of the configuration information) multiple groups of alarm triggers. Each group of alarm triggers may be associated with a respective resource utilization metric. A first group of alarm triggers may define multiple first thresholds for a first resource utilization metric (for example, processor utilization). Each first threshold may have an associated first change for the group of computing resources of the customer. A second group of alarm triggers may define multiple second thresholds for a second resource utilization metric (for example, network bandwidth utilization or memory utilization). Each second threshold may have an associated second change for the group of computing resources. The computing resource utilization monitoring service 112 then monitors both resource utilization metrics and sends alarms for both resource utilization metrics if corresponding triggers are met (for example, thresholds are reached). The periodicity of reporting the alarms may be the same or different and a reporting time for the alarms may also be the same or different.

FIGS. 2A-2E show examples of implementing automated techniques for scaling computing resources being provided to clients over one or more computer networks by a computing resource service, such as by continuing the discussion begun with respect to FIG. 1 of a particular customer and computing resource service.

Figure 2A:
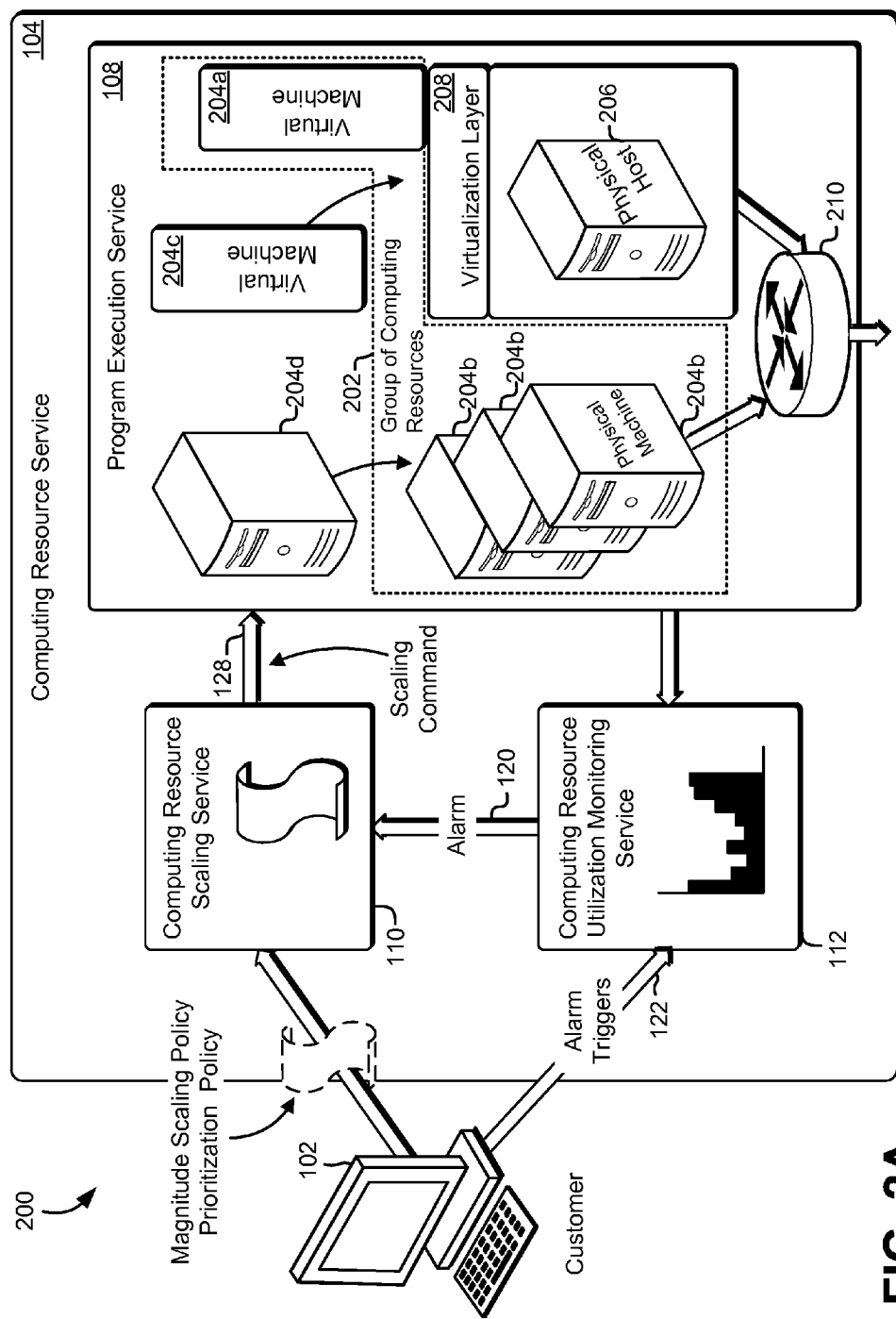
FIGS. 2A-2E show examples of implementing automated techniques for scaling computing resources being provided to clients over one or more computer networks by a computing resource service.

In particular, FIG. 2A shows an example of an environment 200 in which the customer 102 communicates with the computing resource service 104. Similar to the environment 100 described with reference to FIG. 1, the computing resource service 104 includes the program execution service 108, the computing resource scaling service 110 and the computing resource utilization monitoring service 112. Similar elements of the environment 200 as those described with reference to FIG. 1 have the same reference numerals.

The program execution service 108 provides a group of computing resources 202 for use by the customer 102. The group of computing resources 202 is shown in FIG. 2A to include a hosted virtual machine 204*a* (e.g., one of multiple virtual machines hosted on physical machine 206) and a plurality of physical machines 204*b* that do not implement hosted virtual machines in this example. In other embodiments, all computing nodes in the group may be either virtualized computing nodes each implemented on a hosted virtual machine or may each be a non-virtualized physical machine, but not both. In addition, as described herein, computing resources may include any type of computing resource, whether a physical resource or a virtual resource that is instantiated using one or more underlying physical resources. The computing resource may be a computational resource, memory or storage resource or networking resource, among others. For example, the computing resource may be a server, storage drive, router or database, among others.

The virtual machine 204*a* is instantiated using an underlying physical host 206, whereby a virtualization layer 208 is used to provide the virtual machine 204*a*. The virtualization layer 208, which may be a hypervisor, may be used to map the virtual computing resources of the virtual machine 204*a* to physical computing resources of the underlying physical host 206. Execution of the virtual machine 204*a* accordingly utilizes the physical computing resources of the underlying physical host 206.

The group of computing resource 202 may be put into use by the customer. For example, the group of computing resource 202 may operate to execute a web server or an email server of the customer 102. Operating the group of computing resources 202 result in utilizing the computing capability of the group of computing resource 202 as well as other computing capability of the computing resource service 104. For example, if used to provide a web server, a portion of the processing capability of the group of computing resource 202 will be consumed. Furthermore, network traffic (for example, between the group 202 and end users, not shown) will also expend network bandwidth resources available to the group 202. Other resources of the group 202 that are utilized as a result of operating the group 202 include memory or storage resources.

Demand for the group of computing resources 202 may change over time and, accordingly, in periods of high demand, it may be necessary to scale up the group of computing resources to accommodate the demand. Similarly, when the demand decreases, it may be necessary to scale down the group of computing resources. Furthermore, regardless of the demand when the resources of the group 202 are strained it may be desirable to increase the computing resources of the group 202 to ensure that requests handled by the group are timely handled.

A variety of resource utilization metrics may be monitored by the computing resource utilization monitoring service 112. The various resource utilization metrics may be indicative of utilization of the group 202 or of utilization of other computing resources of the computing resource service 104. For example, the resource utilization metrics may include bandwidth utilization of a network device 210 used to exchange network traffic from one or more computing resources of the group 202 to one or more external recipients (not shown). It is noted that in alternative embodiments, the network device may be external to the program execution service 108. The bandwidth utilization may be indicative of a portion of network bandwidth used by the group 202 (for example, out of total network bandwidth available for use by the group 202). Other resource utilization metrics may include memory or storage utilization (for example, calculated as a percentage of used memory or storage to available memory or storage, respectively). Resource utilization metrics may also include read or write operations (for example, measured as the number of read or write operations respectively read from or written to disk), or various other metrics.

Upon evaluating the magnitude scaling policy 124 or the prioritization policy 126 and determining that the group 202 is to be scaled, the computing resource scaling service 110 sends a scaling command 128 to the program execution service 108. The scaling command 128 indicates the change to the computing resources of the group 202. The program execution service 108 then adjusts the quantity of computing resources of the group 202 in response to the scaling command 128. As shown in FIG. 2A for illustrative purposes, when the group of computing resource 202 comprises virtual machines 204*a* and physical machines 204*b*, a further virtual machine 204*c* and a further physical machine 204*d* are added to the group 202.

Scaling the group 202 includes ensuring that the number of computing resource of the group 202 is in accordance with that specified in the scaling command 128. For example, scaling the group 202 may include increasing or decreasing the number of computing resources of the group 202. In addition, scaling the group 202 may include verifying or confirming that the number of computing resources of the group 202 is in accordance with that specified in the scaling command 128 but without changing the number of computing resources. For example, computing resources may be provisioned and added to the group 202. Alternatively, computing resources or removed from the group 202 to scale the group 202. Resizing the group 202 may include re-provisioning virtual machines of the group 202, for example, by "tearing down" or terminating existing virtual machines and adding newly instantiated virtual machines to the group.

As described herein, the computing resources of the group are not limited to virtual machines but may include physical machines or computers, storage drives, networking devices, memory such as random access memory (RAM), Structured Query Language (SQL) databases or Not only SQL (NoSQL) databases, among others. Furthermore, changes to the computing resources may include changing the size of a database or storage device, among others, or otherwise modifying the database or storage device. For example, the read or write speed or location of a database or storage device may be requested to be changed.

Figure 2B:
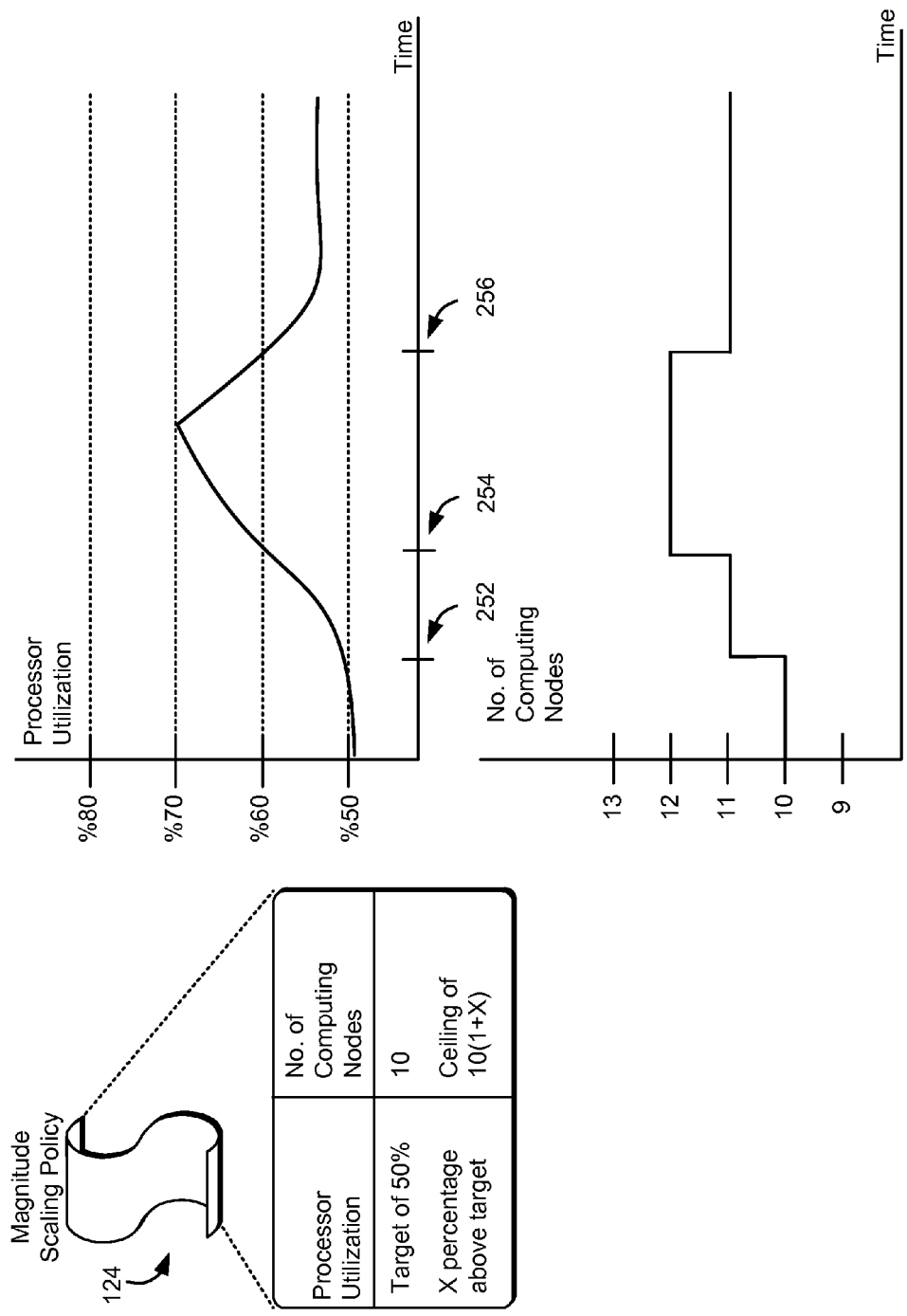

FIG. 2B shows an example of scaling the group of computing resources based on a magnitude scaling policy in accordance with at least one embodiment. In this example, the scaling amount may be based on the magnitude of the breach. For instance, a customer-configured magnitude scaling policy 124 is provided. The magnitude scaling policy is a scale-up policy that specifies a target value or baseline value of 50% utilization for the utilization metric of processor utilization. Accordingly, when the processor utilization is 50% or less, the number of computing nodes of the group of computing resources is desired to be 10. The scaling policy also specifies that if the processor utilization increases over the target utilization (e.g., in the overall range of 50+%), the number of computing nodes is scaled based on the magnitude of the breach (e.g., if the breach is 20% above the target utilization, the scaling is by 20% relative to the desired target level value of computing resources), such as to 12 nodes from 10 nodes in the 20% breach example. In the preceding example, the amount of scaling is proportional to the breach, but it should be appreciated that the amount of scaling based on the magnitude of the breach could be determined any number of ways, such as exponentially, logarithmically, a specified formula, etc. Such specification may be provided by the user in a policy or determined by the scaling service, for example based on historical data or machine learning. In addition, in order to avoid constantly scaling up and scaling down around a threshold, there may be a number of solutions, including using a "swing" or variance (e.g., +/−3%) in a scaling policy or using a scale down policy with a threshold set a certain amount below the scale up threshold.

In FIG. 2B, the customer-configured magnitude scaling policy 124 indicates that the target processor utilization is 50%. At the 50% processor utilization the number of computing nodes should be 10. If the processor utilization increases over 50% by a percentage (denoted as X), the number of computing nodes is correspondingly increases by the same percentage. Because the number of computing nodes is discrete but the resultant percentage increase is not, a ceiling function (or a round up) function is applied. The number of computing nodes to which the group of computing nodes is to be scaled may accordingly be represented as the ceiling of 10(1+X), where X is the percentage by which the processor utilization exceeds 50%.

A diagram for the processor utilization and a diagram for the number of computing nodes are shown in FIG. 2B. Before a first time point 252, the processor utilization is below 50% and, accordingly, the number of computing nodes is 10. Between the first time point 252 and a second time point 254, the processor utilization increases to above 50% but below 60%. The resulting change in the processor utilization (which is between 0 and 10%) necessitates increasing the number of computing nodes by one. Between the second time point 254 and a third time point 256, the processor utilization increases to above 60% but remains below 70%. This 10-20% increase necessitates increasing the number of computing nodes by two to 12. After the third time point 256, the processor utilization decreases to settle between 50% and 60%. Thus, per the policy 124, the number of computing nodes of the group is made to be 11.

The group of computing resource in FIG. 2B includes computing nodes. A customer-configured magnitude scaling policy 124 is provided. The magnitude scaling policy 124 is a scale-up policy that specifies a target value of 50% utilization for the utilization metric of processor utilization. Accordingly, when the processor utilization is 50% or less, the number of computing nodes of the group of computing resources is desired to be 10. The magnitude scaling policy also specifies that if the processor utilization increases by 0 to 10% from the target utilization (e.g., in the overall range of 50+% to 60%), the number of computing nodes is scaled by 20% (e.g., relative to the desired target level value, or to a current value in other embodiments), such as to 12 nodes from 10 nodes. Further, if processor utilization increases by 10-20% above the target (e.g., in the overall range of 60+% to 70%), the number of computing nodes is increased by 30% (e.g., relative to the desired target level value, such as to 13 total in this example, or alternatively in a manner relative to a current value in other embodiments), and if the processor utilization increases by 20-30% above the target (e.g., in the overall range of 70+% to 80%), the number of computing nodes is increased by 80% (e.g., relative to the desired target level value, or to a current value in other embodiments).

The processor utilization is monitored over time. As may be viewed in FIG. 2B, prior to a first time point 252, the processor utilization is below 50%, and thus a group of ten computing nodes is provided for use to a customer. After the first time point 252 and before a second time point 254, the processor utilization rises above 50% but below 60%. A corresponding alarm (not shown) is triggered with that magnitude information, and the number of computing nodes is increased by 20% (or 2) to 12 computing nodes as specified by the magnitude scaling policy 124. As described herein, the computing resource utilization monitoring service 112 described with reference to FIG. 1 may send an alarm 120 indicating that the processor utilization has increased above a threshold of 50%, along with a corresponding magnitude.

Between the second time point 254 and a third time point 256, the processor utilization increases over 60% but below 70%. Thus, based on the magnitude scaling policy, the number of computing nodes is increased by 30% with reference to the number of computing nodes associated with the target (i.e., the number of computing nodes is scaled to 13).

Between the third time point 256 and a fourth time point 258, the processor utilization falls below 60% and remains over 50%. Thus, the number of computing resources is scaled to 20% of the level associated with the target (or 12), such as in accordance with a scaling down policy (not shown) that is symmetrical to the illustrated scaling up policy, although in other embodiments such scaling up and down policies for a given metric may not be symmetrical. After the fourth time point 258, the number of computing resources is scaled to 13 because the processor utilization again rises to the range of 60-70%. Furthermore, after a fifth time point 260, the number of computing resources is scaled by 80% to 18 because the processor utilization rises to between 70% and 80% (i.e., falls in the range of 20-30% above the target of 50%).

Thus, such a magnitude scaling policy may specify multiple threshold levels defined relative to the target level. Furthermore, for each defined threshold, a proposed change to the group may be specified, such as a change relative to the target level or a current value, or an absolute change (e.g., set the number of computing nodes to 20 total, regardless of a current value). The relative change may, for example, be a percentage increase or decrease with respect the quantity of computing resources of the group that are associated with the target utilization, as illustrated in the example of FIG. 2B.

Figure 2C:
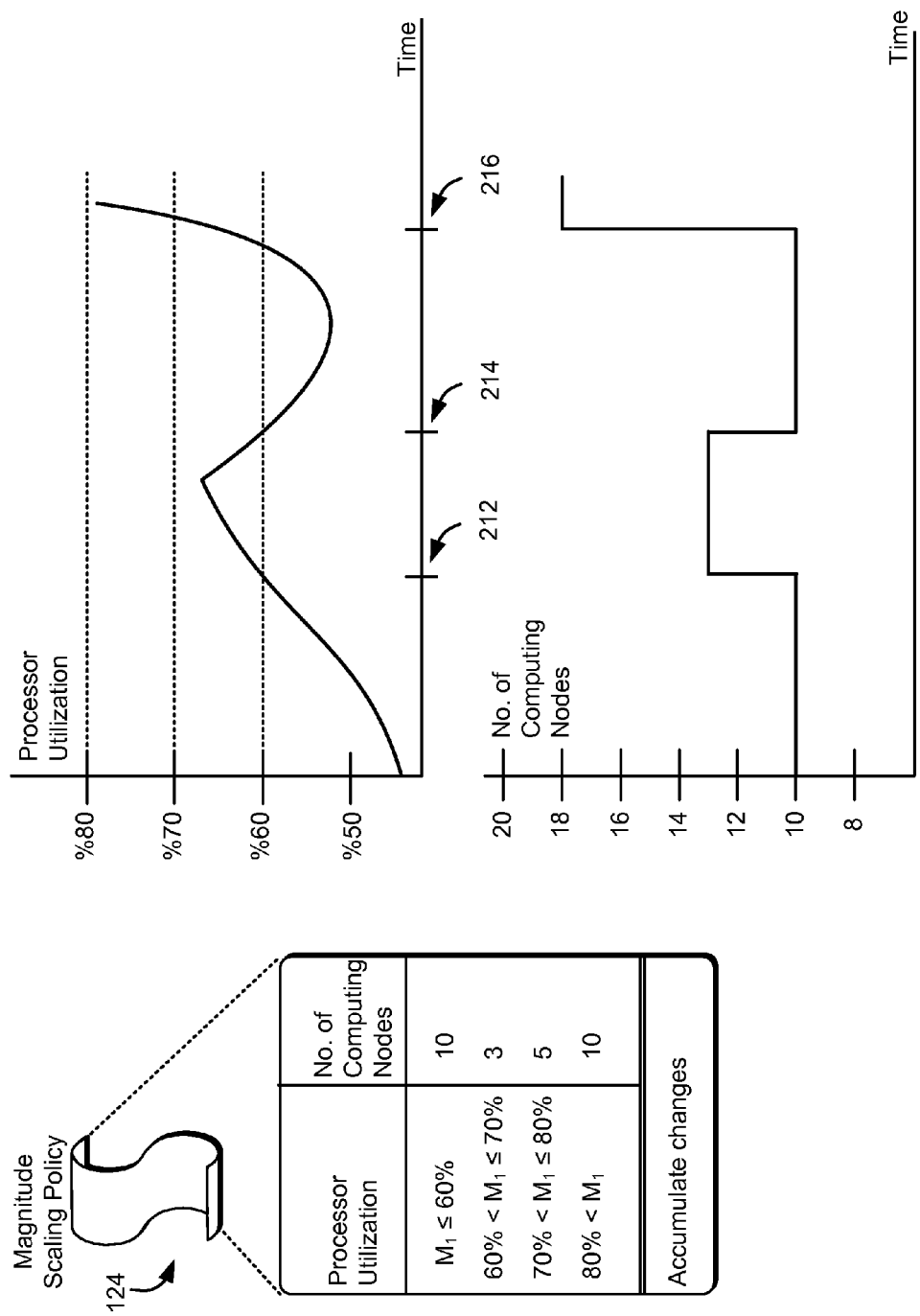

FIG. 2C shows an example of scaling the group of computing resources based on a magnitude scaling policy in accordance with at least one embodiment. The group of computing resource in FIG. 2C includes computing nodes. Customer-configured alarm triggers are provided in the magnitude scaling policy 124. The alarm triggers indicate multiple defined thresholds for the processor utilization metric and an associated proposed change in the number of computing nodes for each threshold.

Furthermore, the magnitude scaling policy 124 specifies a manner of aggregating at least two changes in the number of computing nodes, such as if two or more threshold levels are breached based on a magnitude of one or more measurements for a metric. As shown in FIG. 2B, the magnitude scaling policy 124 in this example specifies that the changes are to be accumulated. In various scenarios, a largest or smallest change of the at least two changes may be selected. Or, alternatively, an outcome of another function of the at least two changes may be used, such as an average or a median. Furthermore, a most recently received requested change may be selected or earliest received requested change. In various embodiments, a requested change may be applied to a group of computing resources and the results of applying the change are monitored. Automated learning may further be used in some embodiments to determine a manner of aggregating multiple requested changes based at least in part on the monitored results, such as by observing whether aggregating the requested changes in a particular manner (e.g., by accumulating) subsequently results in minimizing the observed resource utilization metrics in a desired manner. Accordingly, accumulation may be later used for aggregating the multiple requested changes.

The processor utilization is monitored over time. As may be viewed in FIG. 2C, prior to a first time point 212, the processor utilization is below 60% and, thus, a group of ten computing nodes are provided for use to a customer. After the first time point 212 and before a second time point 214, the processor utilization rises above 60% but below 70%. As required by the configuration information, the number of computing nodes is increased by 3 to 13 computing nodes as a result of the threshold of 60% being met. Between the second time point 214 and a third time point 216, the processor utilization falls below 60%. As a result, the number of computing nodes is reduced by 3 to 10. At around the third time point 216, the processor utilization increases from below 50% to above 70%. As a result of the increase two specified thresholds are met; the 60% threshold of the 60-70% range and the 70% threshold of the 70-80% range. The 60% threshold has an associated change of 3 computing nodes and the 70% threshold has an associated change of 5 computing nodes.

The magnitude scaling policy is evaluated to determine how to aggregate the two changes. The magnitude scaling policy specifies that in the event of two or more requested changes, the changes are to be accumulated. Accordingly, the two changes are accumulated for a total of 8 computing nodes and the number of computing is accordingly scaled by 8 to 18 computing nodes. The requested changes may be relative changes to the quantity of computing resources of a group. Alternatively, the requested changes may be absolute changes or differences between absolute quantities and a current quantity of computing resources of the group.

Figure 2D:
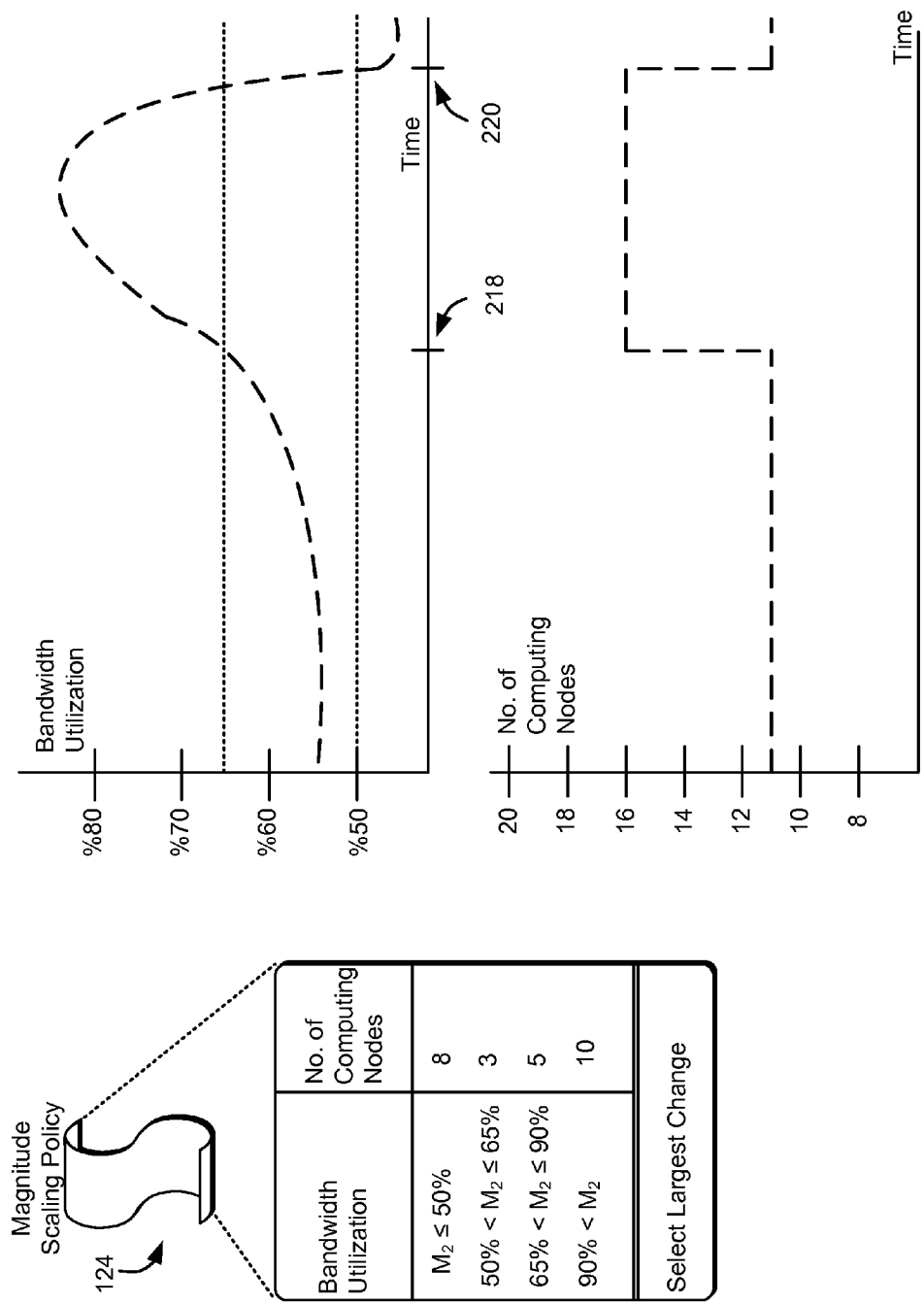

FIG. 2D shows an example of scaling the group of computing resources based on a different magnitude scaling policy for a different resource utilization metric in accordance with at least one embodiment, such as to be implemented in addition to (e.g., simultaneously with) or instead of the magnitude scaling policies discussed with respect to FIG. 2B or 2C. Similar to the example described with reference to FIG. 2C, the computing resources are computing nodes. However, unlike the example of FIG. 2C, the monitored resource utilization metric is bandwidth utilization and the magnitude scaling policy 124 calls for selecting the largest requested change when two or more threshold levels are breached based on a magnitude of one or more measurements for the bandwidth utilization metric (as opposed to accumulating the requested changes in the example of FIG. 2C, or to addressing each proposed change individually in the example of FIG. 2B). In various embodiments, the requested change may be of other types, such as to change a type and/or a geographical location of one or more provided computing resources (such as a computing node). For example, a change to the processing or processor speed, memory or storage resources or other attributes of the computing node may be requested. Furthermore, a change to a location of a subset of the group, all of the group or additional computing resources of the group may be requested. For example, the geographical location of the computing resource may be that of a server farm or data center hosting the computing resource.

The alarm triggers in this example specify that if the bandwidth utilization is below 50%, the number of computing nodes of the group of computing resources 202 should be 8. If the bandwidth utilization increases to greater than 50% but less than 65%, the number of computing nodes is increased by 3. Further, if the bandwidth utilization increases to greater than 65% but less than 90%, the number of computing nodes is increased by 5, and if the bandwidth utilization increases to greater than 90%, the number of computing nodes is increased by 10. Likewise, the number of computing nodes is decreased by the corresponding amounts if the bandwidth utilization falls to the specified range, such as if symmetrical scaling up and scaling down policies are specified.

As viewed in FIG. 2D, the bandwidth utilization is initially between 50% and 65% and, accordingly, the number of computing nodes of the group is 11. The bandwidth utilization then, at a first time point 218, increases above 65% and remains below 90%. Accordingly, the number of computing nodes is increased by 5 to 16 as a result of 65% bandwidth utilization threshold being met. Then, near a second time point 220, the bandwidth utilization decreases to below 50%. As a result of the decrease, two thresholds are met; the 65% threshold and the 50% threshold. Each threshold is associated with a change to the number of computing resources. The 65% threshold is associated with a change of 5 computing nodes and the 50% threshold is associated with a change of 3 computing nodes. Because the magnitude scaling policy 124 calls for the largest change to be selected, the number of computing nodes of the group is reduced by 5 (i.e., the largest of 3 and 5) to 11 after the second time point 220.

Figure 2E:
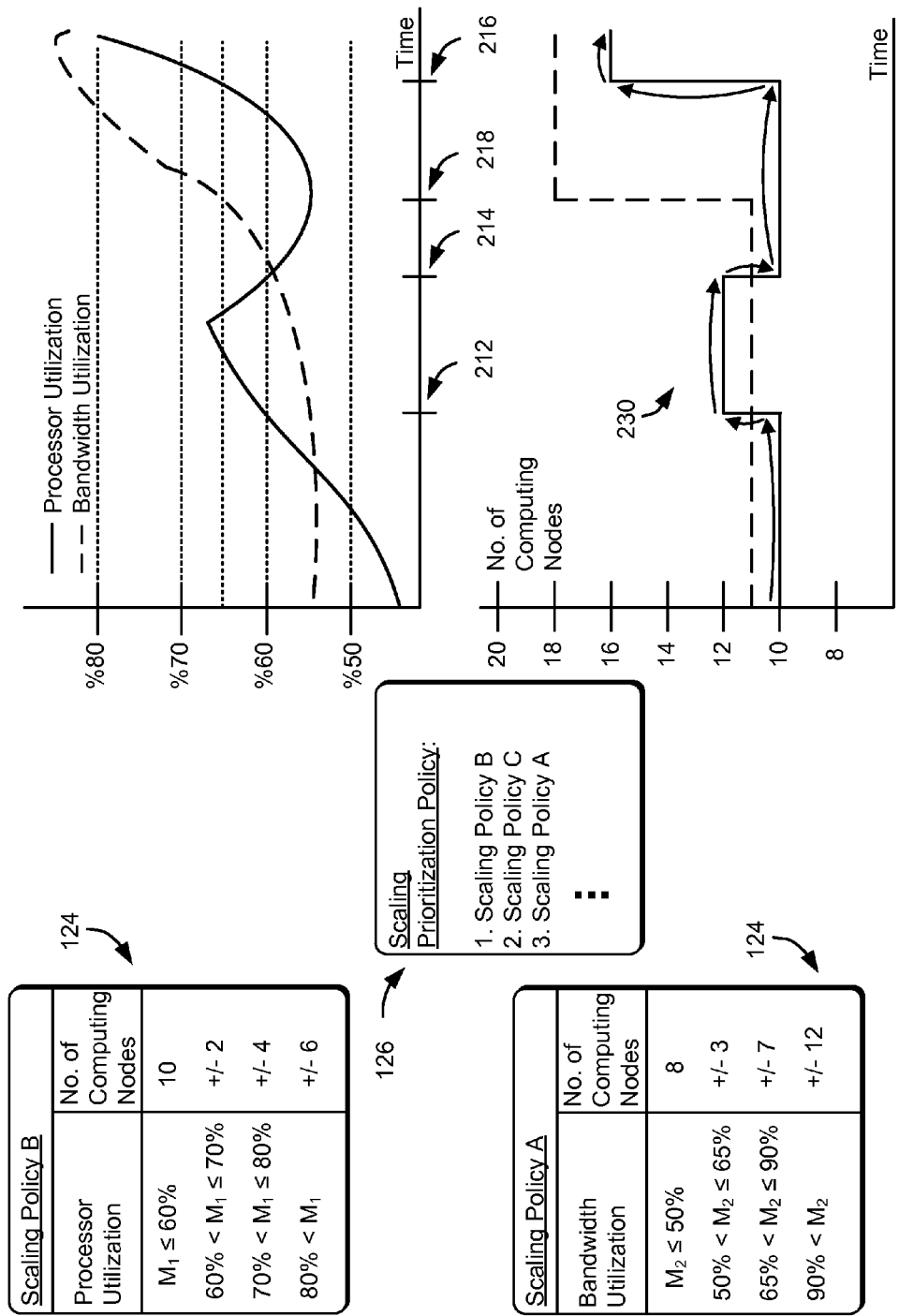

FIG. 2E shows an example of scaling the group of computing resources based at least in part on a prioritization policy in accordance with at least one embodiment. Magnitude scaling policies 124 for both processor utilization and bandwidth utilization metrics are provided, with the magnitude scaling policy for the processor utilization being labeled scaling policy B, and the magnitude scaling policy for the processor bandwidth utilization being labeled scaling policy A. The magnitude scaling policies 124 are similar to those described with reference to FIGS. 2B-2D. In addition, a prioritization policy 126 is also provided. The prioritization policy 126 calls for prioritizing changes to the group resulting from the processor utilization metric over all other metrics (as shown highest on an ordered priority list). It will be appreciated that priorities may be specified in other manners in other embodiments, including with respect to scaling policies, resource utilization metrics, defined thresholds, and/or proposed changes.

Both the processor utilization metric and the bandwidth utilization metric are monitored are described with reference to FIGS. 2B-2D. Because the processor utilization metric and the bandwidth utilization metric both have thresholds breached that result in different proposed changes to the group, the prioritization policy 126 is evaluated to determine what change(s) to implement. Because the scaling prioritization policy 126 specifies that processor utilization (scaling policy B) is to be prioritized over other scaling policies C (not illustrated in FIG. 2E) and A (for bandwidth utilization), one or more proposed changes for the scaling policy B will be implemented in this example.

Accordingly, processor utilization is prioritized over bandwidth utilization per the prioritization policy 126, and the group is scaled in accordance with the changes resulting from the processor utilization metric.

The prioritization policy 126 may alternatively specify other types of actions to take in other embodiments, such as that the largest change of the multiple changes is selected or that the smallest change is selected, or that the result of a specified function (e.g., specified by a user) that takes all or a portion of the multiple changes as input is to determine one or more changes to implement. Accordingly, the prioritization policy is evaluated to determine one or more changes in quantity to make to a group of computing resources, such as to select a single change in this example. The single change may be determined by identifying one of the two or more resource utilization metrics that has a highest priority. Further, a specified change in quantity associated with one of at least two defined triggers is selected, whereby the selected change is for the identified one resource utilization metric. Whereas the specified change for the one resource utilization metric, changes of other lower priority resource utilization metrics are not performed and may be designated as such.

The prioritization policy may be similarly configured as the magnitude scaling policy with the difference that it applies to multiple changes resulting from different resource utilization metrics. For example, the prioritization policy may specify that the one change selected based at least in part on the prioritization policy is the smallest, largest, last received or earliest received, among others.

Figure 3:
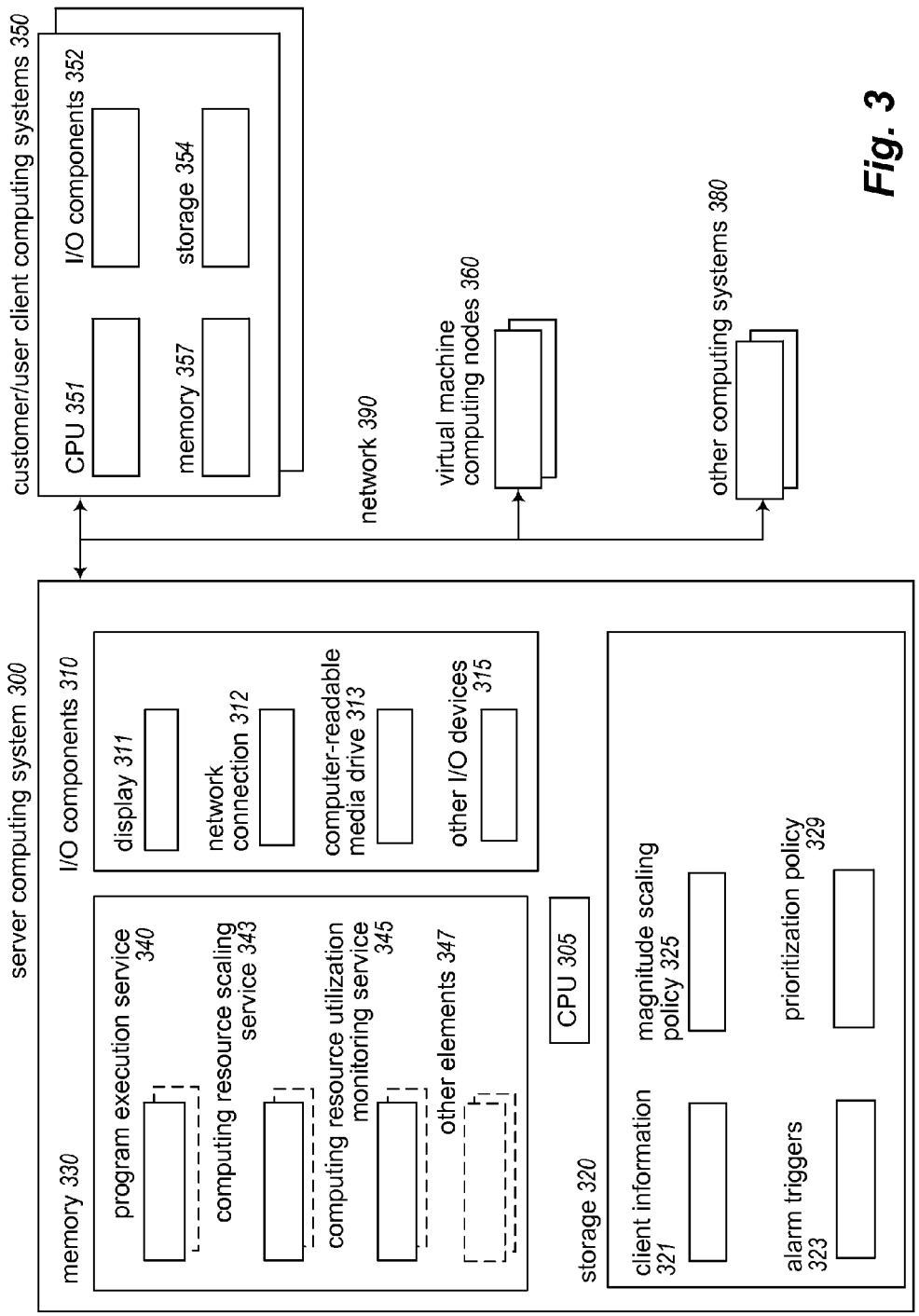
FIG. 3 is a block diagram illustrating example computing systems suitable for executing an embodiment of a system for performing automated techniques for scaling computing resources being provided to clients over one or more computer networks by a computing resource service.

FIG. 3 is a block diagram illustrating example computing systems suitable for performing techniques for scaling a group of computing resources. In particular, FIG. 3 illustrates a server computing system 300 suitable for providing at least some functionality of a program execution service, a computing resource scaling service and a computing resource utilization monitoring service, although in other embodiments multiple computing systems may be used for the execution or functionality of the computing resource scaling service may not be provided. FIG. 3 also illustrates various client computing systems 350 that may be used by customers or other users of the program execution service, the computing resource scaling service and/or the computing resource utilization monitoring service, virtual machine computing nodes 360 that may be used by the program execution service, the computing resource scaling service and/or the computing resource utilization monitoring service, and optional other computing systems 380.

The server computing system 300 has components in the illustrated embodiment that include one or more hardware CPU ("central processing unit") computer processors 305, various I/O ("input/output") hardware components 310, storage 320, and memory 330. The illustrated I/O components include a display 311, a network connection 312, a computer-readable media drive 313, and other I/O devices 315 (e.g., a keyboard, a mouse, speakers, etc.). In addition, the illustrated client computing systems 350 may each have components similar to those of server computing system 300, including one or more CPUs 351, I/O components 352, storage 354, and memory 357, although some details are not illustrated for the computing systems 350 for the sake of brevity. The other computing systems 380 and computing nodes 360 may also each include components that are similar to some or all of the components illustrated with respect to server computing system 300, but such components are not illustrated in this example for the sake of brevity.

One or more components 343 of an embodiment of a computing resource scaling service 343 are executing in memory 330, and in some embodiments each includes various software instructions that when executed program one or more of the CPU processors 305 to provide an embodiment of the computing resource scaling service as described elsewhere herein. The component(s) 343 (e.g., corresponding to some or all of components 116 and 118 of FIG. 1) interact with computing systems 350 and 380 and computing nodes 360 over the network 390 (e.g., via the Internet and/or the World Wide Web, via a private cellular network, etc.). In this example embodiment, the component(s) 343 include functionality related to receiving a magnitude scaling policy and/or a prioritization policy, evaluating the magnitude scaling policy to determine a change to a group of computing resources or evaluating the prioritization policy to determine one of multiple changes to the group and causing the group to be scaled on behalf of the customers or other users, such as in conjunction with a program execution service provided. The component(s) 343 may further include functionality related to interacting with the computing resource utilization monitoring service 345 to receive alarms indicating that one or more alarm thresholds are met, such as with an indication of an associated magnitude. The other computing systems 350 and 380 and computing nodes 360 may also be executing various software as part of interactions with the program execution service 340. For example, client computing systems 350 may be executing software in memory 357 to interact with the computing resource utilization monitoring service 345 (e.g., as part of a Web browser, a specialized client-side application program, etc.), such as to interact with one or more interfaces (not shown) of the computing resource scaling service 343 to configure and control scaling the group of computing resources, as well as to perform various other types of actions, as discussed in greater detail elsewhere. Various information related to the functionality of the program execution service and the computing resource scaling service 340, 343 may be stored in storage 320, such as information 321 related to clients of the program execution service or the computing resource scaling service (e.g., account information), information 323 related to the alarm triggers, information 325 related to the magnitude scaling policy and information 329 related to the prioritization policy.

The computing nodes 360 may have various forms in various embodiments, such as to include a number of hosted virtual machines executing on one or more physical computing systems. In some embodiments, the server computing system 300 and computing nodes 360 may be part of a data center or other group of co-located computing systems, or may otherwise be computing nodes of a private network. In addition, in some embodiments, the computing resource scaling service 343 may interact with one or more other computing systems 380, such as to receive alarm and/or to monitor one or more resource utilization metrics. In some embodiments, the computing resource scaling service 343 may further interact with the program execution service 340, such as to provision computing nodes of a customer.

One or more components 345 of an embodiment of a computing resource utilization monitoring service are also executing in memory 330 in this example embodiment, and in some embodiments each includes various software instructions that when executed program one or more of the CPU processors 305 to provide the described functionality for the computing resource utilization monitoring service, such as to monitor resource utilization metrics of a group of computing resources of a customer. The component(s) 345 in this example interact with the computing resource scaling service provided by the component(s) 343 via the server computing system 300 (e.g., via shared memory, an internal bus, etc.), although in other embodiments the computing resource utilization monitoring service and the computing resource scaling service may instead interact via one or more intervening computer networks. Various information related to the functionality of the components 340 may also be stored in storage 320, such as information 329 related to customers of the computing resource scaling service and/or executable images to be executed.

It will be appreciated that computing systems 300, 350 and 380 and computing nodes 360 are merely illustrative and are not intended to limit the scope of the present invention. The computing systems and/or nodes may instead each include multiple interacting computing systems or devices, and the computing systems/nodes may be connected to other devices that are not illustrated, including through one or more networks such as the Internet, via the Web, or via private networks (e.g., mobile communication networks, etc.). More generally, a computing node or other computing system or device may comprise any combination of hardware that may interact and perform the described types of functionality, including without limitation desktop or other computers, database servers, network storage devices and other network devices, PDAs, cell phones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated components 340 and/or 345 may in some embodiments be distributed in additional components. Similarly, in some embodiments some of the functionality of the components 340 and/or 345 may not be provided and/or other additional functionality may be available.

It will also be appreciated that, while various items are illustrated as being stored in memory or on storage while being used, these items or portions of them may be transferred between memory and other storage devices for purposes of memory management and data integrity. Alternatively, in other embodiments some or all of the software components and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the component(s) 340 and/or the component(s) 345) and/or data structures, such as by execution of software instructions of the one or more software programs and/or by storage of such software instructions and/or data structures. Furthermore, in some embodiments, some or all of the systems and/or components may be implemented or provided in other manners, such as by using means that are implemented at least partially or completely in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the components, systems and data structures may also be stored (e.g., as software instructions or structured data) on a non-transitory computer-readable storage medium, such as a hard disk or flash drive or other non-volatile storage device, volatile or non-volatile memory (e.g., RAM), a network storage device, or a portable media article to be read by an appropriate drive (e.g., a DVD disk, a CD disk, an optical disk, etc.) or via an appropriate connection. The systems, components and data structures may also in some embodiments be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4:
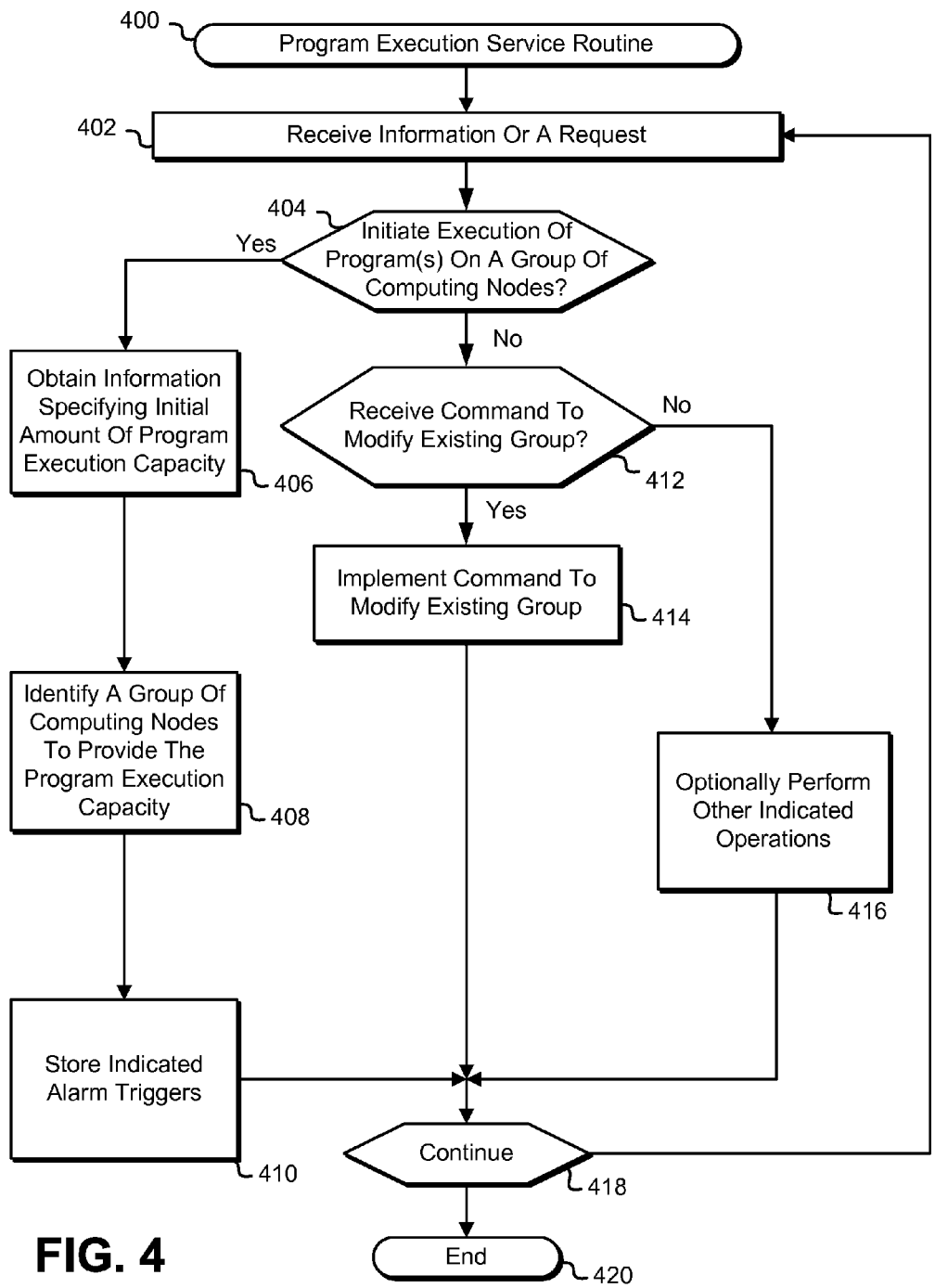
FIG. 4 is a flow diagram of an example embodiment of a Program Execution Service routine.

FIG. 4 is a flow diagram of an example embodiment of a program execution service routine 400. The routine may be provided by, for example, the program execution service 108 of FIG. 1 and/or the program execution service component 340 of FIG. 3, such as to assist in managing use of groups of computing resource for users, as well as to perform other types of management operations in some situations. In this illustrated embodiment, the routine 400 manages various aspects of use of a program execution service that provides program execution capacity for executing programs on behalf of multiple users.

In the illustrated embodiment, the routine begins at block 402, where information or a request is received. The routine continues to block 404 to determine if the received request or information is related to initiating execution of one or more programs on a group of computing nodes, such as a request from a user. If so, the routine continues to block 406 to obtain information regarding the requested program execution, such as an initial desired amount of program execution capacity for the computing node group (e.g., a desired computing node quantity). Optionally one or more programs are obtained to be executed. As discussed elsewhere, in some embodiments, a user may select from one or more of various types of computing nodes and/or may otherwise specify various amounts and/or types of computing resources desired (e.g., processing unit type/amount, memory amount, platform specification, etc.). In block 408, the routine then selects the computing nodes to be used for the group, and in block 410 initiates making those selected computing nodes available for the user, such as by provisioning the selected computing nodes and optionally initiating execution of the one or more programs to be executed. When the computing nodes are available for use on behalf of the user, the user may be notified of the availability in various manners, or in other embodiments the computing nodes may operate in an automated manner without further interaction by the user. The routine then continues to block 410 to store information related to the computing node group, including any user-specified triggers for the group.

If it is instead determined at block 404 that a request to initiate execution of a group of computing nodes is not received, the routine instead continues to block 412 to determine whether a request is received related to modifying the existing group, such as from the scaling resource service or from a user. If so, the routine continues to block 414 to implement the command to modify the existing group. To implement the command, the number or type of computing resources of the group may be changed as described herein. The command may also be the result of evaluating the scaling aggregation or prioritization policies based at least in part on received alarms.

If it is instead determined at block 412 that a command to modify the existing group is not received, the routine instead continues to block 416 to optionally perform one or more other indicated operations. Such operations may include, for example, one or more of the following: user requests related to performing other types of program execution (if the program execution service provides such other program execution types), such as to execute a single program on a single computing node; user-specified group modification requests that are to be performed immediately (e.g., a user instruction to terminate execution of a particular indicated computing node, such as if the computing node is not operating properly); user requests to obtain various status information related to one or more computing node groups with which the user is associated; requests to perform administrative-related activities for a user, such as subscription, registration, or payment operations; etc. Further, any user billing (or reimbursement) activities may be performed based on the information or request received in block 402 or as is otherwise initiated (e.g., periodically), such as to charge and/or collect fees from one or more users based on program execution functionality provided to the users. The routine may further optionally perform periodic housekeeping operations as appropriate.

The routine continues to block 418 to determine whether to continue, such as until an explicit indication to terminate execution of the routine. If it is determined to continue, the routine returns to block 402, and if not continues to block 420 and ends. It will be appreciated that additional types of activities may be performed in some embodiments and situations, such as to determine whether users are authorized to perform particular requested operations, to immediately obtain payment from users for some types of requested operations, etc. In addition, while user requests and other operations are indicated in the illustrated embodiment as being performed in a manner specific to a particular computing node group and a particular associated user, in other embodiments some or all such operations may instead be applied more generally, such as to multiple computing nodes groups associated with a single user and/or from multiple users associated with one or more computing node groups.

Figure 5:
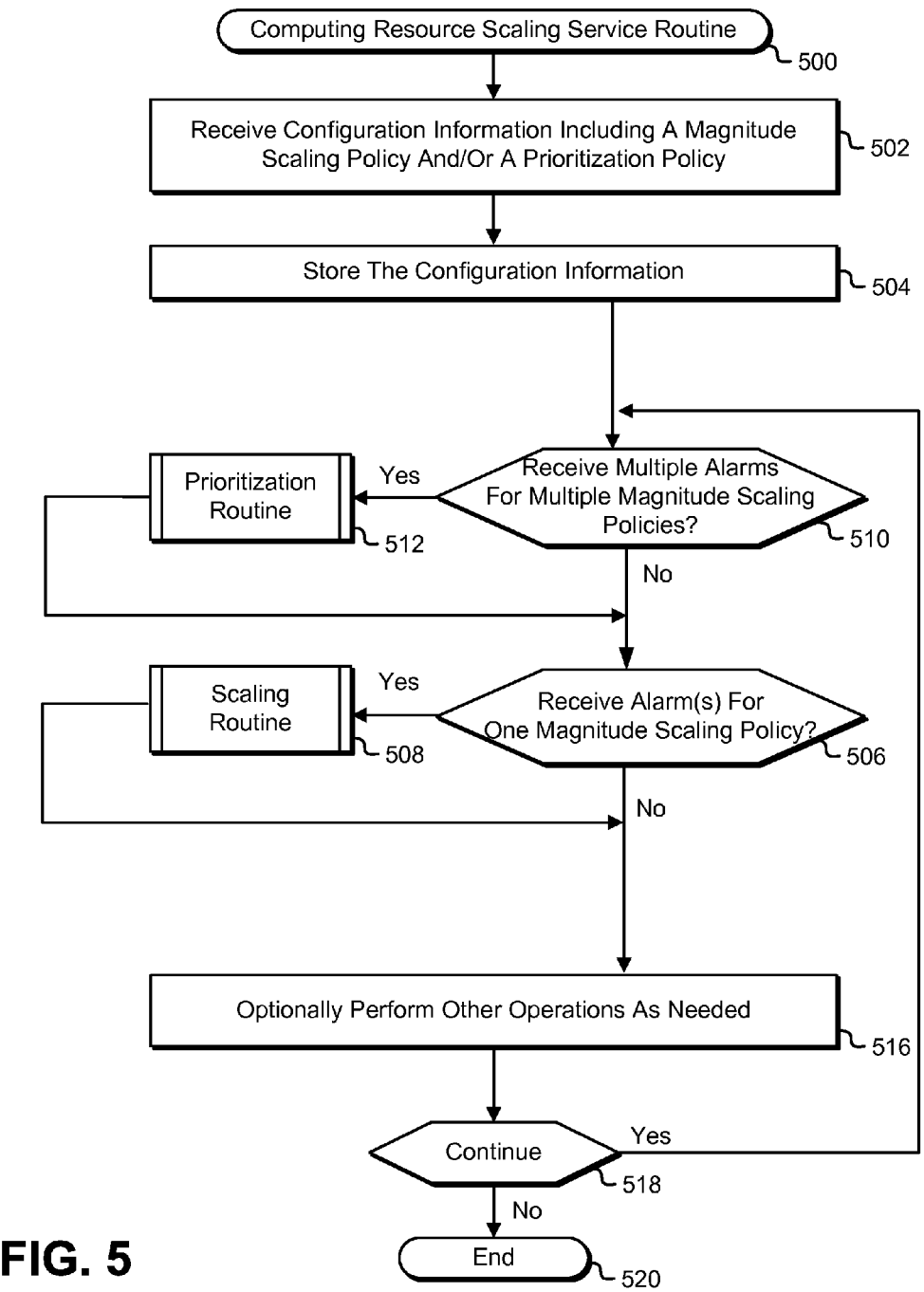
FIG. 5 is a flow diagram of an example embodiment of a Computing Resource Scaling Service routine.

FIG. 5 is a flow diagram of an example embodiment of a computing resource scaling service routine 400. The routine may be provided by, for example, the computing resource scaling service 110 of FIG. 1 and/or the computing resource scaling service 343 of FIG. 3, to scale the computing resources of a customer of a computing resource service. The routine 500 begins at block 502 with receipt of configuration information including a magnitude scaling policy and/or a prioritization policy. At block 504, the configuration information is stored. Further, alarm triggers based on a target level for a value of a resource utilization metric and/or multiple threshold levels defined relative to the target level may be provided to a computing resource utilization monitoring service for issuing alarms based on such alarm triggers. The computing resource utilization monitoring service may monitor one or more resource utilization metrics as described herein to determine whether to issue corresponding alarms, such as with an indicated magnitude.

A determination is made, at block 510, as to whether multiple alarms are received for multiple magnitude scaling policies or otherwise for multiple metrics, such as within a defined amount of time. If so, the routine 500 proceeds to block 512 where a prioritization routine is initiated, with one example of such a routine described with reference to FIG. 7 herein. Thereafter, or if a negative determination is made at block 510, a determination is made at block 506 as to whether one or more alarms for one magnitude scaling policy (or otherwise for a single utilization metric) are received. If so, the routine 500 proceeds to block 508 where a scaling routine is initiated, with one example of such a routine described with reference to FIG. 6.

After implementing the scaling routine at block 508, or if a negative determination is made at block 506, other operations are optionally performed as needed at block 516. For example, user billing or reimbursement based on actions taken might be performed, as well as housekeeping operations. A determination is then made, at block 518, as to whether the routine 500 should continue, and if a positive determination is made the routine returns to block 510. If a negative determination is made, the routine ends at block 520. It should be appreciated that, in the Computing Resource Scaling Routine 500, it is not necessary to perform both the prioritization routine 512 and the scaling routine 508, and that either may be performed independently without the other.

Figure 6:
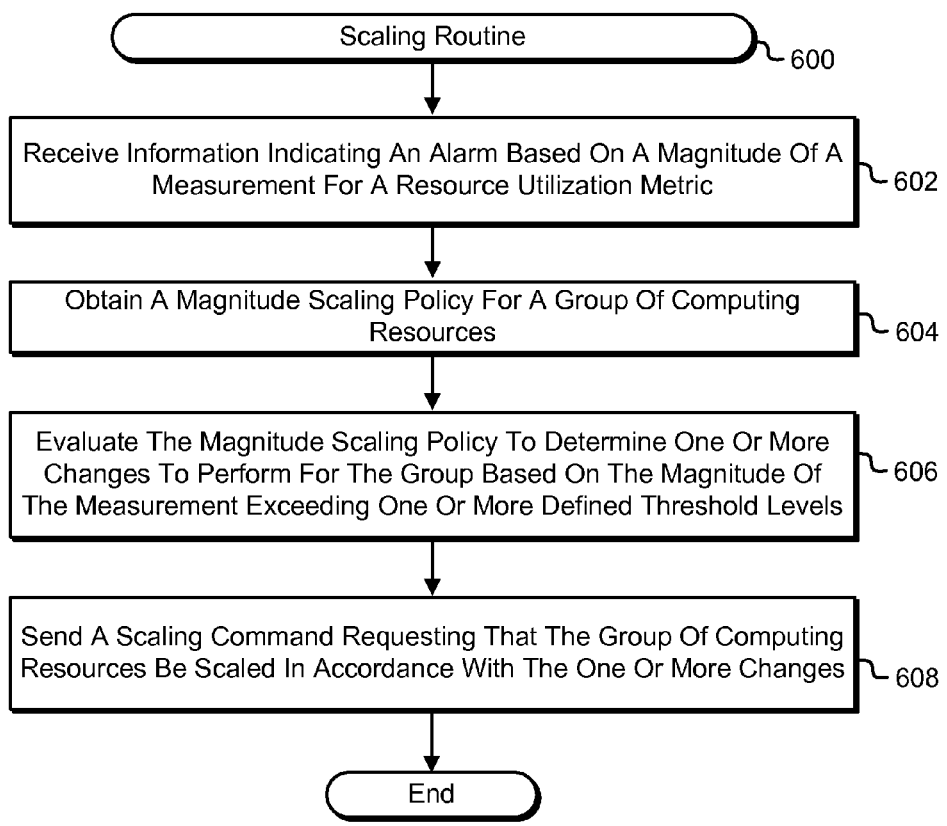
FIG. 6 is a flow diagram of an example embodiment of a scaling routine.

FIG. 6 is a flow diagram of an example embodiment of a scaling routine 600. At block 602, information is received indicating an alarm having occurred based on a magnitude of a measurement for a resource utilization metric, such as based on the measurement exceeding at least one of multiple defined threshold levels or by a percentage of a baseline threshold. At block 604, a magnitude scaling policy for a group of computing resources is obtained that specifies a target level for the resource utilization metric, for example based on the magnitude of the breach, and/or multiple related defined threshold levels each having an associated proposed change for the group. At block 606, the magnitude scaling policy is evaluated to determine one or more changes to perform for the group based at least in part on the magnitude of the measurement exceeding one or more defined threshold levels. For example, if one threshold level is crossed, the change corresponding to that level may be implemented, such as if the threshold is breached by 20%, the magnitude scaling policy may respond by increasing the amount of computing resources by 20%. Conversely, if two or more threshold levels are crossed in the instance multiple thresholds are taken into account each with corresponding scaling values, the changes corresponding to either or both threshold levels may be implemented. The routine 600 then proceeds to block 608 and a scaling command is sent requesting that the group of computing resources be scaled in accordance with the one or more changes.

Figure 7:
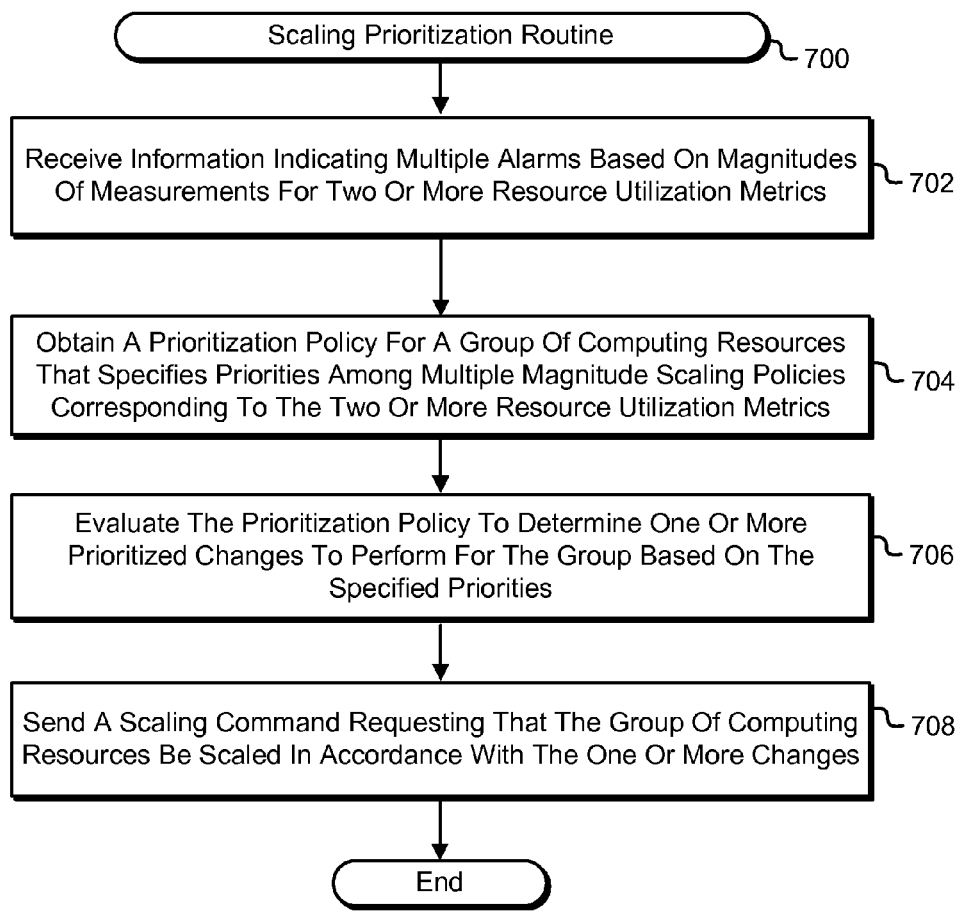
FIG. 7 is a flow diagram of an example embodiment of a prioritization routine.

FIG. 7 is a flow diagram of an example embodiment of a prioritization routine 700. At block 702, information is received indicating multiple alarms having occurred based on magnitudes of measurements for two or more resource utilization metrics, such as to indicate that the measurements have magnitudes that exceed two or more of the multiple defined threshold levels. The information may be received from a computing resource utilization monitoring service and may indicate that alarm triggers (for example, thresholds) for two different types of resource utilization metrics, such as processor utilization and bandwidth utilization, are met. At block 704, a prioritization policy is obtained for a group of computing resources that specifies priorities among multiple magnitude scaling policies corresponding to the two or more resource utilization metrics. At step 706, the prioritization policy is evaluated to determine one or more prioritized changes to perform for the computing resources of the group based at least in part on the specified priorities. For example, a single change in a quantity of computing resources of the group may be performed.

At block 708, a scaling command requesting that the group of computing resources be scaled in accordance with the one or more changes is sent. In the event that the computing resources are computing nodes, the scaling command may be send to a program execution service. Alternatively, a computing resource may be database managed or provisioned by a database service. Accordingly, the scaling command to increase or decrease the size of the database may be sent to the database service.

Figure 8:
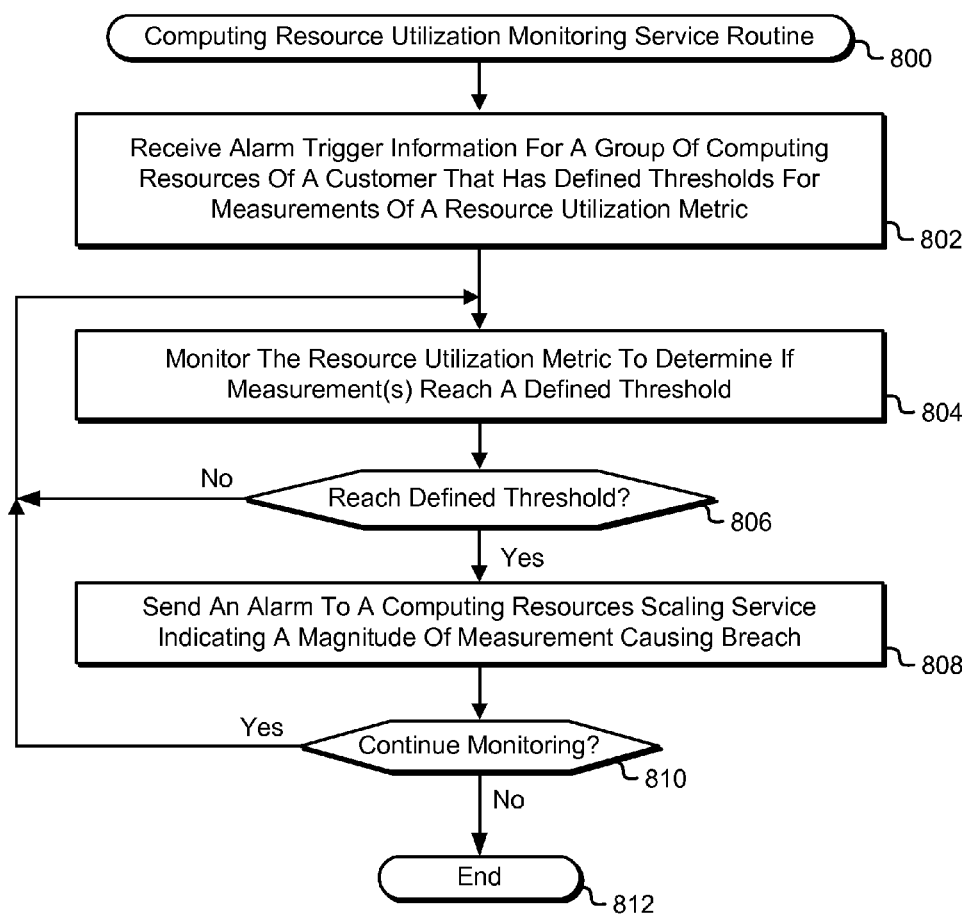
FIG. 8 is a flow diagram of an example embodiment of a Computing Resource Scaling Service routine.

FIG. 8 is a flow diagram of an example embodiment of a computing resource utilization monitoring service routine 800. At block 802, the computing resource utilization monitoring service receives alarm trigger information for a group of computing resources of a customer, including information about defined thresholds for measurements of a resource utilization metric. The computing resource utilization monitoring service monitors, at block 804, the resource utilization metric to determine if a measurement reaches a defined threshold. Upon determining, at block 806, that the resource utilization metric reached the defined threshold, the computing resource utilization monitoring service sends a corresponding alarm to the computing resource scaling service at block 808, such as with information about a corresponding magnitude. If an alarm trigger is not met, the computing resources scaling service routine 800 reverts to block 804 and continues monitoring the resource utilization metric.

After the alarm is sent at block 808, the routines 800 determines at block 810 whether monitoring should be continued and if so the computing resources scaling service routine 800 reverts to block 804 and continues monitoring the resource utilization metric. If not, the routine 800 ends at block 812.

It is noted that routine 800 may monitor alarm triggers for multiple resource utilization metrics concurrently. Furthermore, the routine may be configured to send alarms periodically or according to an aperiodic schedule for different resource utilization metrics, different computing resource groups or different customers. For example, all the alarms pertaining to one resource utilization metric may be sent one minute apart if triggers are met. However, the alarms pertaining to another resource utilization metric may be sent at different times. Similarly, the timing of sending alarms may be different or the same for different resource groups or different customers.

It will also be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, synchronously or asynchronously, etc.) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method, comprising:
   receiving, by one or more configured computing systems of a computing resource service, a scaling policy from a customer of the computing resource service for use in scaling a quantity of computing nodes in a group provided to the customer by the computing resource service, wherein the scaling policy specifies a target level for a value of a resource utilization metric and that changes to the quantity of computing nodes in the group will be magnitude-based changes proportional to a magnitude of difference between an actual value for the resource utilization metric and the target level;

receiving, by the one or more configured computing systems, information indicating that a monitored value for the resource utilization metric exceeds the target level by a first magnitude;

determining, by the one or more configured computing systems and based at least in part on the scaling policy a first magnitude-based change in the quantity of computing nodes for the group that is proportional to the first magnitude; and performing, by the one or more configured computing systems, the determined first magnitude-based change to the group.

2. The computer-implemented method of claim 1 wherein the receiving of the scaling policy further includes receiving information about multiple threshold levels defined relative to the target level, each of the multiple threshold levels being associated with a defined change to the quantity of computing nodes in the group, and wherein the determining of the first magnitude-based change includes selecting the defined change for at least one of the multiple threshold levels.

3. The computer-implemented method of claim 2 further comprising:

monitoring a defined alarm trigger that is associated with the resource utilization metric and indicates the target level as a desired level for the resource utilization metric and indicates each of the multiple defined threshold levels as a magnitude of difference from that target level; and initiating, based at least in part on determining from the monitoring that a defined threshold level of the multiple defined threshold levels is reached, an occurrence of the alarm to cause the receiving of the information indicating that the monitored value for the resource utilization metric exceeds the target level by the first magnitude.

4. The computer-implemented method of claim 3 wherein the alarm trigger specifies each of the multiple defined thresholds as a relative change from the specified target level.

5. The computer-implemented method of claim 1 wherein the determining of the first magnitude-based change includes selecting a relative change in the quantity of computing nodes for the group that is relative to the quantity of computing nodes, and wherein the performing of the determined first magnitude-based change includes changing the quantity of computing nodes for the group by the relative change.

6. A non-transitory computer-readable medium having stored contents that cause a computing system to at least:

receive, by the computing system, a scaling policy for use in scaling a group of computing resources that includes a quantity of computing nodes, wherein the scaling policy specifies a target level for a resource utilization metric and that changes to the quantity of computing nodes in the group will be magnitude-based changes based at least in part on a magnitude of difference between an actual value for the resource utilization metric and the target level;

receive, by the computing system, information about a measured actual value for the resource utilization metric that exceeds the target level by a first magnitude;

determine, by the computing system and based at least in part on the scaling policy, one or more changes for the group that include a first magnitude-based change to the quantity of computing nodes in the group based on the first magnitude; and initiate, by the computing system, the determined one or more changes in the group, including performing the first magnitude-based change to the quantity of computing nodes in the group.

7. The non-transitory computer-readable medium of claim 6 wherein the group of computing resources includes storage capabilities, wherein the determined one or more changes further include at least one of a specified amount of change or a specified type of change to the storage capabilities, and wherein the initiating of the determined one or more changes in the group includes performing one or more changes in at least one of amount or type of the storage capabilities.

8. The non-transitory computer-readable medium of claim 6 wherein the computing system is part of a computing resource service that provides computing resources to a plurality of customers, and wherein the stored contents include software instructions that, when executed, further cause the computing system to:

provide a customer with access to the computing resources that are part of the group; and monitor, by the computing system, the computing resources of the group to determine when operation of the computing resources of the group causes the measured actual value for the resource utilization metric to exceed the target level.

9. The non-transitory computer-readable medium of claim 6 wherein the first magnitude-based change is of an amount that is a difference between a specified absolute quantity and a current value of the quantity of computing nodes in the group, and wherein the initiating of the determined one or more changes further includes changing the current quantity of the computing nodes in the group by the amount of the difference.

10. The non-transitory computer-readable medium of claim 6 wherein the determined one or more changes include an indicated change to a type of one or more computing resources of the group, and wherein the initiating of the determined one or more changes further includes changing the type of the one or more computing resources of the group based at least in part on the indicated change.

11. The non-transitory computer-readable medium of claim 6 wherein the determined one or more changes include an indicated change to a geographical location of one or more computing resources in the group, and wherein the initiating of the determined one or more changes further includes changing the geographical location of the one or more computing resources based at least in part on the indicated change.

12. The non-transitory computer-readable medium of claim 6 wherein the group further includes one or more storage resources, and wherein the initiating of the determined one or more changes includes modifying the one or more storage resources.

13. The non-transitory computer-readable medium of claim 6 wherein the receiving of the scaling policy includes receiving information about multiple threshold levels that are defined relative to the target level, and wherein the determining of the one or more changes includes selecting the first magnitude-based change based on one or more of the multiple threshold levels.

14. The non-transitory computer-readable medium of claim 13 wherein at least one threshold level of the one or more threshold levels is associated with multiple changes to the group.

15. The non-transitory computer-readable medium of claim 13 wherein the stored contents further cause the computing system to:

determine that the measured actual value for the resource utilization metric exceed the one or more threshold levels; and select the first magnitude-based change based on one or more specified changes associated with the one or more threshold levels.

16. A system comprising:

one or more hardware processors; and memory with stored computer executable instructions that, when executed by the one or more processors, cause the system to manage scaling of a group of computing resources that includes a quantity of computing nodes, the system configured to:

receive a policy for use in scaling the group of computing resources, wherein the policy specifies a target level for a resource utilization metric and that changes to the group will be magnitude-based changes based at least in part on a magnitude of difference between an actual value for the resource utilization metric and the target level;

receive information indicating that a measured actual value for the resource utilization metric exceeds the target level by a first magnitude;

determine, based at least in part on the policy, one or more changes for the group that include a first magnitude-based change to the quantity of computing nodes in the group based at least in part on the first magnitude; and initiate the determined one or more changes in the group, including the first magnitude-based change to the quantity of computing nodes in the group.

17. The system of claim 16 wherein the receiving of the policy further includes receiving information about two or more threshold levels that are defined relative to the target level and that are each associated with a change to the group, and wherein the determining of the one or more changes includes selecting the first magnitude-based change based on the associated change for at least one of the threshold levels.

18. The system of claim 17 wherein the actual measured value for the resource utilization metric exceeds the two or more threshold levels, and wherein the selecting of the first magnitude-based change includes selecting a largest change associated with the two or more threshold levels.

19. The system of claim 16 wherein the determining of the one or more changes includes determining an outcome to a function applied to a difference in the measured actual value for the resource utilization metric and the target level for the resource utilization metric.

20. The system of claim 17 wherein the determining of the one or more changes includes determining a change to a type of computing resource of the group, and wherein the initiating of the determined one or more changes includes changing the type of the computing resource.

* * * * *

UNITED STATES PATENT AND TRADEMARK OFFICE
CERTIFICATE OF CORRECTION

| | | |
|---|---|---|
| PATENT NO. | : 10,021,008 B1 | Page 1 of 1 |
| APPLICATION NO. | : 14/754491 | |
| DATED | : July 10, 2018 | |
| INVENTOR(S) | : Derek Solomon Pai et al. | |

It is certified that error appears in the above-identified patent and that said Letters Patent is hereby corrected as shown below:

In the Claims

Column 25, Line 2 Claim 15:
"utilization metric exceed the one or more threshold" should read, --utilization metric exceeds the one or more threshold--.

Signed and Sealed this
Twenty-fifth Day of September, 2018

Andrei Iancu
*Director of the United States Patent and Trademark Office*